US006769032B1

(12) United States Patent
Katiyar et al.

(10) Patent No.: US 6,769,032 B1
(45) Date of Patent: Jul. 27, 2004

(54) AUGMENTED PROCESSING OF INFORMATION OBJECTS IN A DISTRIBUTED MESSAGING FRAMEWORK IN A COMPUTER NETWORK

(75) Inventors: Dinesh Katiyar, Redwood City, CA (US); Eshwar Belani, San Jose, CA (US); Pradeep Javangula, San Jose, CA (US)

(73) Assignee: E.piphany, Inc., San Mateo, CA (US)

( * ) Notice: Subject to any disclaimer, the term of this patent is extended or adjusted under 35 U.S.C. 154(b) by 0 days.

(21) Appl. No.: 09/311,908

(22) Filed: May 14, 1999

Related U.S. Application Data

(60) Provisional application No. 60/085,534, filed on May 15, 1998.

(51) Int. Cl.$^7$ ............................................... G06F 15/16
(52) U.S. Cl. ..................... 709/246; 709/203; 709/245; 709/217; 709/218; 707/3; 707/103
(58) Field of Search ............................... 709/201, 202, 709/225, 218, 219, 217, 203, 245, 246; 370/312; 707/103, 10, 522; 379/90.02, 900

(56) References Cited

U.S. PATENT DOCUMENTS

| | | | |
|---|---|---|---|
| 5,187,787 A | | 2/1993 | Skeen et al. |
| 5,257,369 A | | 10/1993 | Skeen et al. |
| 5,307,413 A | * | 4/1994 | Denzer .......................... 380/49 |
| 5,347,633 A | * | 9/1994 | Ashfield et al. ............. 709/217 |
| 5,557,798 A | | 9/1996 | Skeen et al. |
| 5,826,025 A | * | 10/1998 | Gramlich .................... 709/217 |
| 5,974,451 A | * | 10/1999 | Simmons ..................... 709/218 |
| 6,070,187 A | * | 5/2000 | Subramaniam et al. ..... 709/220 |
| 6,226,642 B1 | * | 5/2001 | Beranek et al. ............... 707/10 |

* cited by examiner

Primary Examiner—Marc D. Thompson
Assistant Examiner—Beatriz Prieto
(74) Attorney, Agent, or Firm—Bingham McCutchen LLP; Fabio E. Marino; Jeffrey S. Smith

(57) ABSTRACT

Augmenting processing of information objects transferred among processors within a network. Processing is performed by a process, or processor, (called a "robot") at any point in the network where an information object is transferred, or where the object resides. By allowing processing at source, destination and at "interim" points between the source and destination, the ability to add functionality, services, control and management of objects and object transfers is greatly enhanced. The robots, can reside at any point in the system. A robot can be local to an end-user's computer, can reside on a content source server, or can be on another computer, processor, storage location or device on the network. Any type of processing can be performed by the robots. For example, access rights can be maintained so that certain attributes and values of information objects are restricted on a per user, per machine, chronological or other basis. Robots can use conditions which, when satisfied by attribute/value pairs within a specific object, or conditions which are satisfied by other, external, conditions, trigger specific processing. The processing can include one or more objects, other information processing, software or hardware control functions, etc. Information can be appended to objects. Statistics on object use, publication, subscription or transfers can be compiled. Groups of robots can operate in cooperation. Robots can share information.

35 Claims, 18 Drawing Sheets

AUGMENTED PROCESSING OF INFORMATION OBJECTS IN A DISTRIBUTED MESSAGING FRAMEWORK IN A COMPUTER NETWORK

CLAIM OF PRIORITY

This application claims priority from U.S. Provisional Patent Application Serial No. 60/085,534 filed on May 15, 1998, entitled APPARATUS AND METHOD FOR DISTRIBUTED MESSAGING FRAMEWORK BASED ON NETWORK ADDRESSABLE SEMANTICALLY INTERPRETABLE BYTE SETS AND DATA PLACES TO PROVIDE AUTOMATIC DATA DEFINITION MANAGEMENT, PERSISTENCE AND ROUTING OF STRUCTURED INFORMATION ACROSS NETWORKED PROCESSES; which is hereby incorporated by reference as if set forth in full in this application.

The following co-pending patent applications are related to this application and are hereby incorporated by reference as if set forth in full in this application:

USER INTERFACE FOR A DISTRIBUTED MESSAGING FRAMEWORK BASED ON NETWORK ADDRESSABLE SEMANTICALLY INTERPRETABLE BYTE SETS AND DATA PLACES TO PROVIDE AUTOMATIC DATA DEFINITION MANAGEMENT, PERSISTENCE AND ROUTING OF STRUCTURED INFORMATION ACROSS NETWORKED PROCESSES; Ser. No. 09/283,264; Filed Apr. 1, 1999.
SYSTEM AND METHOD FOR CONTROLLING ACCESS TO RESOURCES IN A DISTRIBUTED ENVIRONMENT; application Ser. No. 09/312,019, filed May 14, 1999.
SYSTEM AND METHOD FOR PUBLISHING INFORMATION FROM SEMI-STRUCTURED INFORMATION STORES; application Ser. No. 09/312,194, filed May 14, 1999.
EXTENSIBLE USER INTERFACE FOR A DISTRIBUTED MESSAGING FRAMEWORK IN A COMPUTER NETWORK, application Ser. No. 09/312,129, filed May 14, 1999.
PUBLISH-SUBSCRIBE ARCHITECTURE USING INFORMATION OBJECTS IN A COMPUTER NETWORK, application Ser. No. 09/312,131, filed May 14, 1999.

COPYRIGHT NOTICE

A portion of the disclosure recited in the specification contains material which is subject to copyright protection. Specifically, a Microfiche Appendix in accordance with 37 CFR Section 1.96 is included that lists source code instructions for a process by which the present invention is practiced in a computer system. The Microfiche Appendix comprises 13 sheets of microfiche containing 377 frames, or pages, of source code. The copyright owner has no objection to the facsimile reproduction of the specification as filed in the Patent and Trademark Office. Otherwise all copyright rights are reserved.

BACKGROUND OF THE INVENTION

This invention relates in general to data processing in networked computers and, more specifically, to an object-oriented approach for handling digital information in large distributed networks such as an Intranet or the Internet.

The evolution of computer systems and computer networks is one of accelerating growth. Individual computer systems are equipped with vast amounts of storage and tremendous processing power. Even as these computing resources have increased, the physical size of the systems has decreased, along with the cost of such systems, so that the number of computer systems has grown dramatically.

Not only has the number of computer systems increased at an astounding rate, but improvements in telecommunications have contributed to making massive worldwide networks such as the Internet a reality. However, these advances in computer systems and computer network technology make an overwhelming amount of information available. So much so that it is difficult for a user to extract desired information from the network or to be able to efficiently use the network to accomplish many tasks. Although the Internet has made it very easy to both publish information as well as access it through content servers and browsers, respectively, this opportunity has given rise to thousands of information publishers and millions of information consumers.

This phenomenal growth is making it increasingly difficult for an information consumer to hook up with the publishers that are of interest. A second problem is that the continuous exchange of information in the form of data or algorithms between the myriad types of computer systems, or platforms, which are foreign to one another and mutually incompatible, means that a user of the Internet needs to be aware of compatibility issues such as which types of applications run on which platform, what data formats can be used with which applications, etc. A third problem with the Internet is that, although computer systems have acquired resources to be able to run very large, resource-intensive application programs, this type of "fat" resident application, or client, on a user's machine does not fit today's Internet paradigm where restricted bandwidth makes it impractical to transfer large amounts of data or programs. Also, the shear volume of information and number of users means that stored space on the various server computers making up the Internet, and used to perform routing of information on the Internet, is at a premium.

Brute-force "keyword" search engines already prove incapable of effectively solving the problems of the Internet. A whole plethora of "push" technologies s emerging that is attempting to provide solutions to this problem within some spectrums. A few "publish-subscribe" solutions exist, but these demand a fair amount of infrastructure at both the publisher and consumer ends. Each of the shortcomings of these approaches is discussed in turn.

Keyword Search

An example of the inefficient data search and retrieval of the popular keyword search engines is illustrated by the following example of performing a simple search to locate job candidates.

Assume, as was done in an actual test case, that the user of a computer system on the Internet wants to locate and hire computer programmers. Using traditional Internet search technology, the user might go to a website such as AltaVista, Yahoo!, HotBot, etc., and enter a search query for "programmer available." This search on AltaVista in February 1998, produced 166 documents matching the query. However, the vast majority of these documents are useless in accomplishing the goal of finding a job candidate. For example, many of the documents are outdated. Other of the documents merely use the phrase "programmer available" in ways other than to identify an actual job candidate. Some of the documents are from "dead" links which no longer exist and are inaccessible. Many of the documents were duplicate documents resulting from peculiarities in the way the database is compiled and maintained.

Many of the documents in the search results would not be useful even if they identified an available programmer candidate. This is because the candidates are from different places in the world and many of the documents are old, meaning the programmers are probably not available anymore or have moved. Of course, the search can be refined by adding additional keywords, such as the specific type of programming language skill desired, region, restricting the documents to a specific timeframe, etc. However, since the only tool available to the user to refine the search is to add keywords, or to place relational conditions on the keywords, a second full-text search of the entirety of documents on the Internet would yield many of the same problems as in the previous search, along with new problems introduced by unpredictable uses of the additional or modified text phrases in the free-form format of documents on the Internet.

Another limitation with the full-text search engines available on the Internet today is that much of the information on the Internet exists in "dynamic" web pages which are created in response to specific one-time requests or actions by human users or automated signals. Even the so-called "static" web pages are updated frequently, or are left on the Internet long after they cease to be supported or cease to be valid or relevant. Since the search engines compile a database based on "robots" or "spiders" visiting sites on the Internet at repeated time intervals many of their results are unrepeatable or outdated and invalid. Also, the spiders are not able to discover all possible web pages such as pages that might be included in a resume database that is not published in the form of one web page per resume. Still further problems exist with keyword search engines in that use of the text language is not fully standardized. An example of this is that many people use the spelling "programers" instead of "programmers" with two 'm's.

The second problem with the Internet, that of compatibility issues between platforms, programs and data types, is encountered by a user of today's Internet whenever a user tries to obtain software, and sometimes data, from the Internet. Although the Internet has provided a wealth of commercial (and free) software, utilities, tools, etc., much of this software requires a great deal of effort on the part of the user to get it running correctly, or is of little or no value because of incompatibility problems that must be solved at the user's time and expense.

For example, when a user downloads a piece of software, they must know about their computer, operating system, compression/decompression utility required, etc. in order to determine whether the software being downloaded is going to be usable in the first place. Keeping track of proper versions of the software and utilities further complicates matters. This is especially true when the software obtained is designed to work with data of a certain type, such as where the software is used to access multimedia files of a certain provider's format, is a new driver for hardware from a specific manufacturer, etc. This makes it difficult for would-be manufacturers of third party "value-added" utilities to produce software that can be used with other software, data or hardware made by another manufacture. Thus, although today's Internet is successful in making available a plethora of software, utilities, tools, drivers and other useful programs; and can usually adequately deliver the software to a user, it fails in providing a uniform and a seamless environment that eliminates significant compatibility problems essential to allowing a user to easily obtain added functionality.

The third shortcoming of the Internet is the relatively poor ability of the Internet to download large amounts of digital information which make up the data and programs of interest to a user. Today, because of improvements in storage capacity and processing power, a typical user runs applications that are resource-intensive and thus require large amounts of data and large programs to manipulate the data. For example, it is not unusual for a user to download a demonstration program on the order of 10 to 20 megabytes. Such a download through a 28.8 k bit/sec. modem might take 3–6 hours depending on the speed of the user's overall connection to the Internet, server overload, number of server "hops" to connect with the download server, etc. Thus, although the trend in computer systems has been toward larger-and-larger application programs which manipulate huge data structures, this trend is incompatible with a network such as the Internet which is rather limited in the speed with which it can handle the demands of the many millions of users trying to utilize it.

"Push"

The approach of finding out what information a user desires and "pushing" this information to the user by sending it over the network to the user's computer from time-to-time is epitomized by the application PointCast, available at http://www.pointcast.com/. The application program requires the user to specify areas of interest such as categories of news (e.g., politics, business, movies, etc.), specific sports teams, stocks, horoscope, etc. The user's interests are then recorded at a Pointcast server site. Periodically the user is sent, or "pushed," the specific information from Point-Cast's server site to the user's computer. The information is compiled and maintained by PointCast although other companies may be involved.

Although "push" technology such as PointCast has the advantage that the user can be updated automatically about specific categories of information, this approach is not very flexible and does not provide much improvement in obtaining information other than providing a tailored version of the daily newspaper. Drawbacks with "push" technology include the inability of the user to specify arbitrary information—the user must pick from a list; there is no mechanism for the user to obtain information from outside of the "push" provider's server site, and the user cannot upload the user's own information for distribution.

"Push" technology provides uniformity across platforms and data types but it does so only by limiting the user to a single application front end and to information controlled by a single main entity. In this sense, "push" technology thwarts the usefulness of a universal interactive network like the Internet and transforms it into a non-interactive traditional information model, such as radio or television.

Because the pushed information comes from a server or servers controlled by a single entity, push technology fails to create a standardized market for information object, information processing products and information services. Instead, the push approach pits different push providers against each other for user share. The push approach, unlike the Internet paradigm, is not an open approach and, in fact, is contrary to what many view as the exciting and valuable qualities of the Internet.

Publish-Subscribe

The Publish-Subscribe approach provides a more powerful information exchange system than the "push" approach. The Publish-Subscribe approach allows a user, in a similar manner to the "push" approach, to specify the type of information to which the user wishes to subscribe. However, the user is not strictly limited to categories presented by an application program front-end. Rather, a typical Publish-Subscribe approach allows a user to specify more general types of information such as by using a plain-text subject description.

In a Publish-Subscribe network, publishers provide information that is freely available for all users. Publishers can make any generalized type of information available and identify such information by a mechanism such as the "subject" line. With publishers publishing information and identifying the information by subject, and subscribers subscribing to information identified by subject, processes within the Publish-Subscribe network perform the task of matching up the subscription requests with the available published information and setting up resources in the form of, for example, "channels," so that the transfer of information can take place. However, Publish-Subscribe has been successful only in relatively small, proprietary networks where the publishers and subscribers are aware of the types of information in the network and agree on how to identify the information. Since Publish-Subscribe is limited in how the types of information are specified, as by plain-text, for example, a subject header ensuring that a proper match takes place introduces problems similar to those discussed above with the keyword search engines. So far, the Publish-Subscribe approach has failed to be scaled up to be suitable for larger, more generalized networks such as a large intranet or the Internet because the Publish-Subscribe model fails to provide efficient mechanisms allowing simple and versatile unrestricted data subscriptions and efficient, organized and robust distribution of information.

Further, Publish-Subscribe technology relies on custom front-ends that have specific features designed by a single manufacturer. For this reason, Publish-Subscribe technology limits the user in the types of information, and distribution of information, that are possible. Similar to "push" technology, Publish-Subscribe does not provide an "open" information architecture allowing unrelated commercial entities to provide information items, information processing products and information services in a compatible and mutually beneficial manner.

Prior Art Information Processing Models

FIG. 2A shows the prior art models for information processing in networked computer systems.

In FIG. 2A, conventional distributed client/server applications and their manner of processing data are illustrated in diagram form. The execution of a "singleton" application is shown at 160. This represents an application program executing on the user's local computer, such as a desktop computer where almost all of the data and executed instructions reside on the user's computer. The application program has a large amount of data associated with it and typically performs all of its processing on the local data, which may be copies of remote data. The computer is hooked up to a network represented by lines 162. The network, in the singleton application case, is used only to access a common database 163 that might be shared among several users as, for example, in a workgroup. An example of a singleton application is a database program such as would be common in the late 1980s. The common database 163 can be modified by various database application programs executing at the various user computers. Such updates or modifications are typically made through a limited set of commands such as Get/Set illustrated at 164. Data can also be routed through routing hardware 178 to remote data store servers such as 182 via additional network connections such as 180.

Later models of information processing make more use of the network so that more data can be present at remote locations. As shown at 170 the evolved model has a user operating a client at a local computer, or workstation, as before. However, much of the data 173 now resides in a remote location as, for example, at the user's server. Communication with the server (not shown) is via a local network such as an Ethernet, indicated by line 172. Naturally, various copies of data will exist and some copies of the data will necessarily exist at the user's desktop or workstation such as in the user's random access memory (RAM), cache memory or disk, in local files that the user may have designated or that may be automatically created by the client application. However, the model from the user's and the client's point of view is that remote data is being accessed.

Get/Set operations 174 can be performed on the data 173. The data is often obtained from, and synchronized with, other remote databases through one or more networks and associated routing hardware, indicated by networks 176 and 180, routing hardware 178 and remote data store server 182. Additional networks and servers can be used to transfer data to and from the user's local server database as indicated by additional network 184 and data store server 186.

Note that a property of the approaches shown in FIG. 2A is that the processing entity, namely clients 190 and 192, resides in the user's local computer system. Also, as is typical with traditional information processing models, each client is specific and dedicated to processing data of certain types and to performing specific limited tasks. In other words, the dozens of processing applications created by different software manufacturers are incompatible with each other in that they cannot, without considerable effort, be made to process a data structure created by a foreign application program.

From the above discussion, it is apparent that a system that provides for data searching and manipulation on the Internet in an efficient, effective and intuitive manner would be most welcome. The system should provide an environment and architecture that is adaptable for different applications and customizable by information providers and consumers to suit the many types of commercial, recreational, educational and other uses that the Internet fulfills. The system should also operate uniformly across the various computer platforms connected to the Internet and so provide a basis for uniform development of algorithms, or computer programs, to make feasible a third-party value-added market for the Internet. The system should operate efficiently within the boundaries of the Internet's limited bandwidth so as to make today's Internet a truly valuable resource.

SUMMARY OF THE INVENTION

The invention provides a mechanism for augmenting processing of information objects that are transferred among processors within a network. In general, the processing is performed by a process, or processor, (called a "robot") at any point in the network where an information object is transferred, or where the object resides. By allowing processing at source, destination and at "interim" points between the source and destination, the ability to add functionality, services, control and management of objects and object transfers is greatly enhanced. As an example, an object that is a notice of a book that is available for purchase can be published in the system. An interim process, or "robot," detects the book information object and adds text of a review of the book. The resulting augmented object is then available to users of the system, perhaps at an increased cost to the subscribers.

The robots, can reside at any point in the system. For example, a robot can be local to an end-user's computer, can reside on a content source server, or can be on another computer, processor, storage location or device on the network. Any type of processing can be performed by the robots. For example, access rights can be maintained so that certain attributes and values of information objects are restricted on a per user, per machine, chronological or other basis. Robots can use conditions which, when satisfied by attribute/value pairs within a specific object, or conditions which are satisfied by other, external, conditions, trigger specific processing. The processing can include one or more objects, other information processing, software or hardware control functions, etc. Information can be appended to objects. Statistics on object use, publication, subscription or transfers can be compiled. Groups of robots can operate in cooperation. Robots can share information.

In the preferred embodiment, the use of augmenting processes occurs within an overall system architecture and protocol that uses a Network Addressable Semantically Interpretable Byte-Set (NASIB). A NASIB is defined as any series of bytes that can be semantically interpreted by a pre-existing algorithm given sufficient context. A NASIB by this definition could thus be a traditional data structure or even an algorithm. The human client in a traditional client/server paradigm becomes another NASIB process with a higher degree of foreign (may be human) interactivity than other servers. All processing is then viewed as a distributed task whose completion involves transfer and consumption of relevant NASIB across processes in response to voluntary accesses as well as involuntary distribution. Each process and its NASIB are uniquely addressable and fetchable across connected networks (an example of such a WAN would be the Internet or a company intranet).

However to achieve this goal the architecture employs a plethora of unique concepts, apparatus and mechanisms:

1. Encapsulating each information unit is a unique specification system using various types of Network Addressable Semantically Interpretable Byte-Sets (NASIBs).
2. NASIB style processing involves movement of objects and consumption of resources. Processes that participate in such processing are called NASIBs processes. NASIBs have the intrinsic property of being network addressable and serializable.

Any processing entity is network addressable if it can be made available to any requesting algorithm residing on a distributed connected network based on its name, which could be a simple string value or a number identifier. The name in this case needs to contain at least the following two components:

Network Process Identifier: A substring which when handed to an appropriate protocol handler can provide the means to route data packets to that specific process and communication port as identified by the name within the combined name space of the distributed network.

Process Name Space Identifier: A substring which when handed to an appropriate process can provide the means to retrieve a specific set of bytes as identified by this name within the combined name space of that process.

Any processing entity is serializable if, within the same language framework, any of its instances can be converted into a string of bytes that can be stored as an instance of just one underlying language data type and, further, can be recreated back from this one instance to an entity of the original type.

Formal means of encapsulating the state of a NASIB and interacting with it through state-based Equivalency Events and Event Interest Requests (interest in an equivalency).

External Subsystems:

3. Transport and persistence implementations in each NASIB process are looked upon as external subsystems with generic parameterization and switchability being possible. Any physical implementation of a NASIB server usually would possess at least the following external subsystems.
4. Ability to be network addressable as an "outer algorithm."
5. Ability to serve and store any arbitrary byte sets, once identified, within its name space.
6. Ability to garbage collect its content and archive it for later contextual recall based on some predefined policies.
7. Ability to persist and re-create its complete execution state and/or data state to a permanent computer data medium using direct or indirect means.

Pure Data Source/Sink processes, i.e., performing only publishing or providing generic retrieve capabilities are also seen as external to the system. Anyone who can facilitate a byte buffer following a predefined format on a recognizable transport can become a publisher or retriever.

All communications between processes follows four request-reply messaging paradigms, each differentiated from the others on the basis of the life cycle of the transport task:

8. Synchronous Request: Requesting process transmits request message set and waits for reply message set, the transport task expires when a successful or unsuccessful request is sent back from the serving process. No trace of the request or reply is left.
9. Asynchronous Request: Requesting process transmits request message set, sets up a callback rendezvous algorithm and then continues with processing. The transport task expires when a successful or unsuccessful request message set is sent back from the serving process using what is available, until such time the request is cached. The waiting algorithm on the requesting process is then activated. No trace of the request or reply is then left.
10. Asynchronous Cached Request: Requesting process transmits request message set, sets up a callback rendezvous algorithm and then continues with processing. The transport task is persisted by the serving process until the expiration of the cache specification. The cache specification can be in two units.
11. Quality and Quantity of Reply Specification Set
12. Relative or Absolute Time Specification and one push request paradigm.
13. Broadcast Request: Requesting process broadcasts request message sets to one or multiple receivers. Successful transmission (and optional acknowledgement) of the request is considered to be the expiration of the transport task.

Implementation System Assumptions

The logical design of a NASIB server can be implemented in multiple hardware and software systems and in combinations thereof. The logical design is not closely tied to any specific piece of hardware or software. However implementations of such systems assumes certain well-published advances in software technologies representing necessary syntactic or semantic capabilities:

Dynamic Algorithmic Linking: Ability to incorporate new algorithms into virtual address space at run-time.

Basic Polymorphism: Provide basic polymorphism in various types.

Network Socket Interfaces: Provide basic network interfaces and link abstractions, such as sockets for interprocess communications.

Multi-Threading: Ability to run independently schedulable multiple threads of execution in one process which can access the same virtual address space. Also, related synchronization mechanisms like locking are assumed.

Serialization: Capability to serialize a memory object into a persistable string of bytes and vice versa.

Many commercial data languages meet all these requirements; for example, C++, JAVA.

Utility of the Invention

As mentioned earlier, networking technologies have made possible seamless communication between distributed processes running on disparate stations (operating system and CPU), connected through physical or virtual transport schemes. Such networks result in network data streams composed of data structures and algorithms associated with each other through external application semantics. The user picks the necessary applications and then manipulates data in the same process or in a remote process. The invention has multiple applications in multiple application domains, some of which have existed for over two years and some which have become evident only recently, like the Internet and World Wide Web (WWW):

A distributed framework for separation of data structures, algorithms and the association between them.

Specifying a means of dissecting the global name space of knowledge into knowledge domains where all interacting parties agree upon the common nature of data structures, algorithms and their associations. Chaining such domains together creates a unified network wide knowledge domain.

Specifying a canonical description system for self-describing network messages (chunks of raw transport packets) which make it possible for the messages to carry data structures and algorithms anywhere over a connected network.

Facilitating a singular network communication protocol for the meaningful transmission of these canonical messages between NASIBs-aware processes.

Facilitating creation of knowledge domain manager processes (NASIB servers) that provide services built around this canonical knowledge system to knowledge-access applications (NASIB clients).

Service applications built using NASIB architecture to provide the following basic utilities:

Ability to delineate and hook up with an external data structure and algorithm stream.

Ability to selectively call up any global data structure and algorithm and meaningfully manipulate or execute them.

Ability to facilitate changes in data definitions and values to be automatically propagated across all relevant components of the system, by providing for a default-system-enforced synchronization policy.

Multiprocessing virtual address spaces, involving selective memory synchronizations.

Because of the store and forward nature and dynamically mutable characteristics of the system, it is an ideal framework for structured communication applications like Typed Messaging and Structured Workflow. (See FIG. 3.)

An important goal of the NASIB System is to facilitate a singular or limited suite of computer applications, providing a global data structure and algorithm browsing and hosting mechanisms. Presumably, using such an application and employing such a protocol a user can browse and execute data structures and algorithms and combinations thereof (indirectly representing discrete forms of the original applications) to selectively and meaningfully interact with any knowledge domain on the network, a prime example of that being the WWW.

DESCRIPTION OF THE SPECIFIC EMBODIMENTS

Figure 1A:
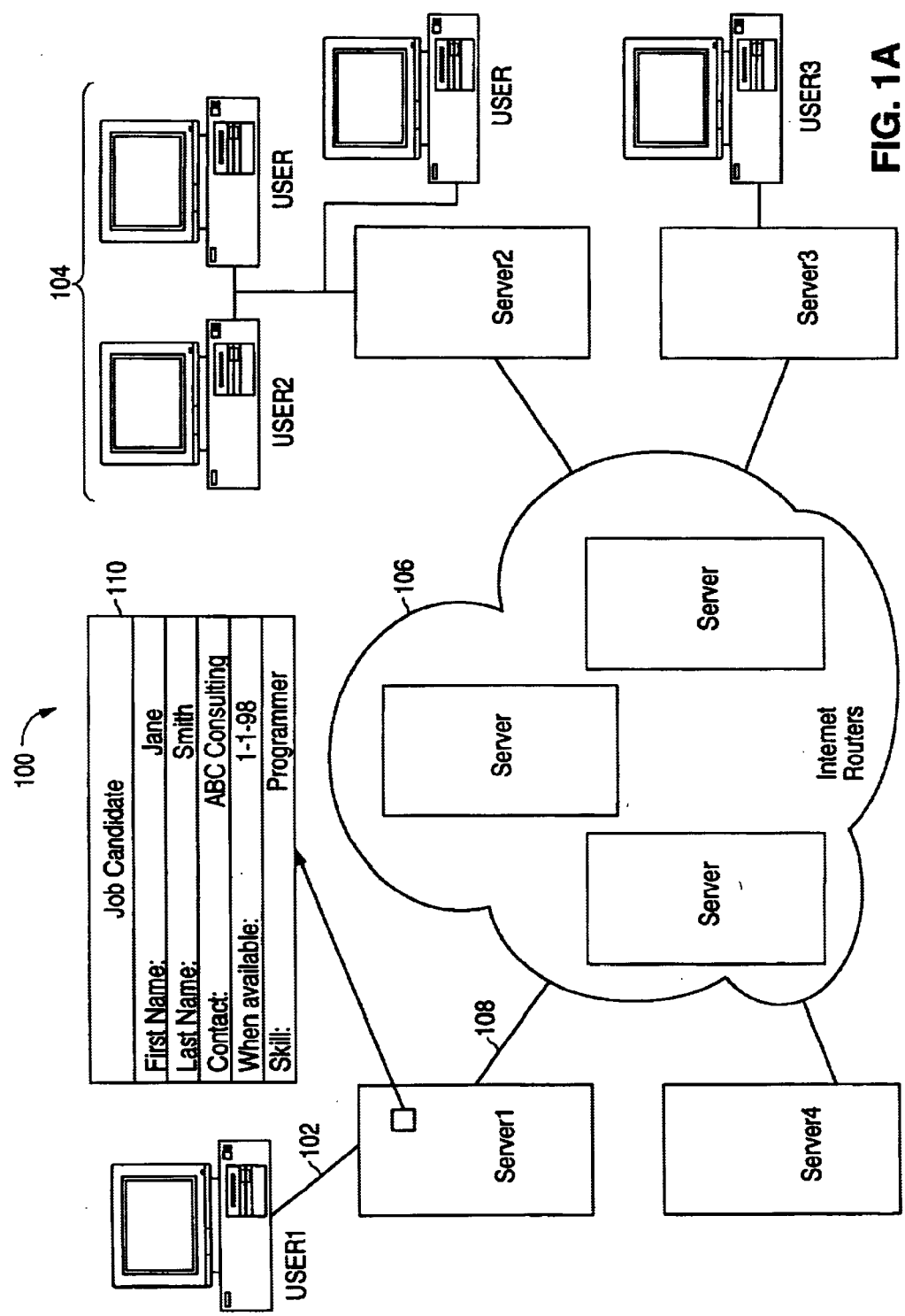
FIG. 1A shows the architecture of a large computer network such as the Internet.

FIG. 1A shows the architecture of a large computer network such as the Internet. Although the present invention is most often discussed herein with respect to the Internet, it will be readily apparent that the invention can be adapted to any2 network or system for exchanging data among multiple users at multiple sites by means of communication and processing equipment such as computers. While the invention in its broadest sense is really a scheme for information handling among multiple users, the preferred embodiment is implemented as several types of processes executing on the Internet to enable a user to more effectively use the Internet.

Figure 1B:
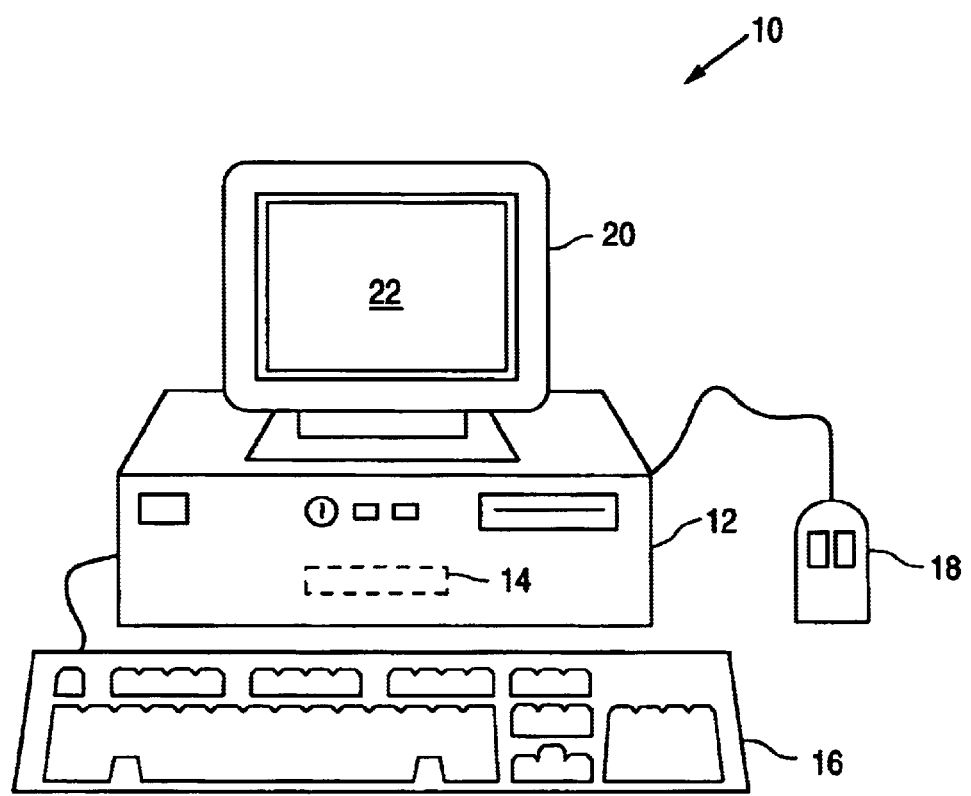
FIG. 1B shows a typical computer such as would be operated by a user on the Internet.
Figure 1C:
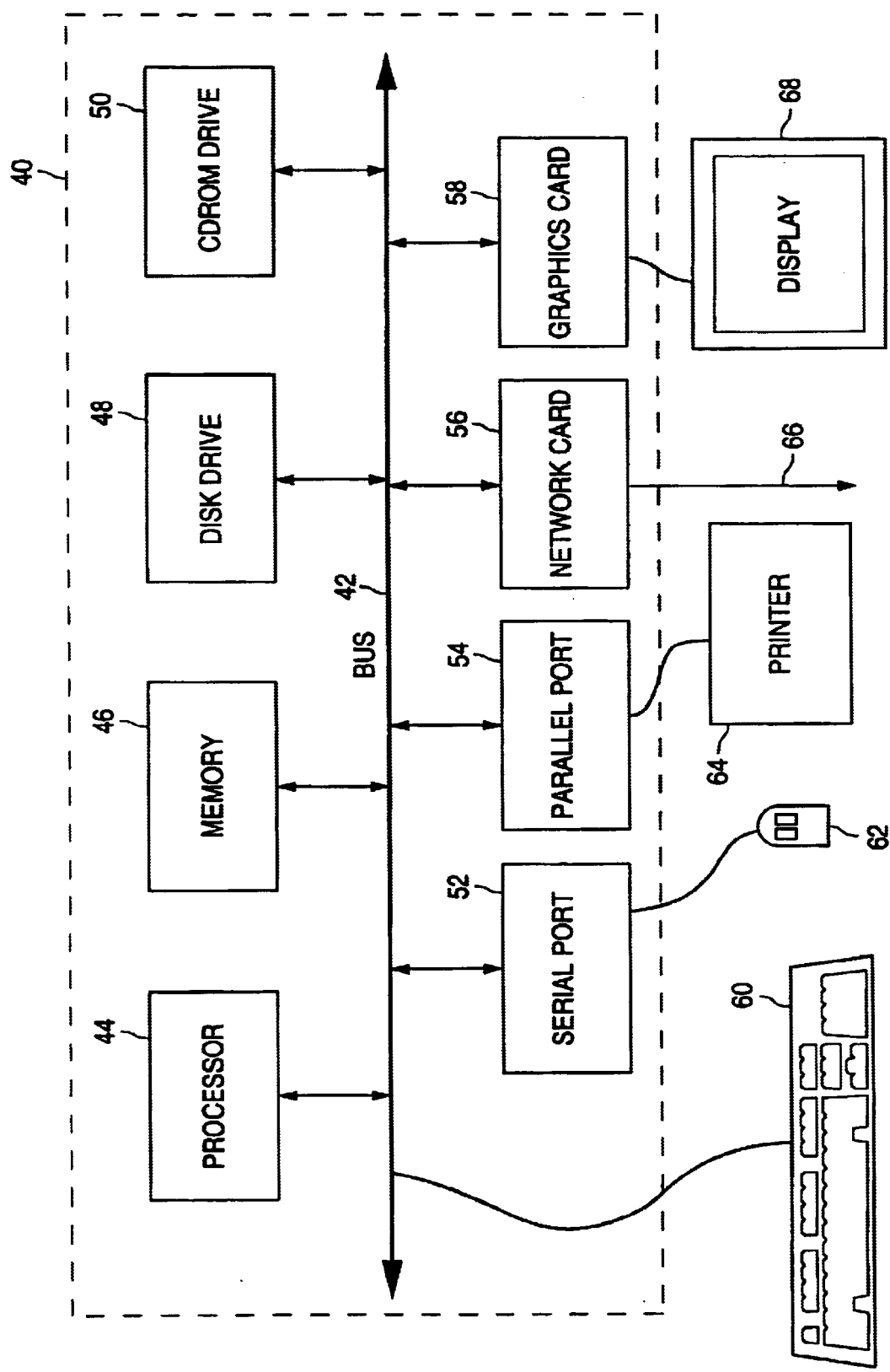
FIG. 1C shows subsystems of the computer of FIG. 1B.

In order to disclose the invention, background on the hardware is first presented and discussed in FIGS. 1A–C. Next, a description of the higher concepts of the information processing model are discussed. Next, more specific details and examples of how different operations are performed is discussed. Finally, a walk-through of the user interface in a "data browser" of the present invention is discussed.

Hardware

FIG. 1A shows an illustration of the Internet as a simplified diagram. In the Internet, multiple users such as USER1, USER2, and USER3, along with other USER machines, are shown. In today's paradigm, a human user typically operates a local computer system such as a desktop, workstation, etc. However, the present invention is suitable for use in user machines with very limited resources as will be shown. Also, it is common for a user to execute programs on a non-networked computer and to connect to the Internet later to exchange information with another computer over the network. As will be apparent, these variations on the users' hardware platform or mode of operation, and other variations, are compatible with the present invention. The system of the present invention can work effectively with any possible distribution of interconnected processors regardless of the specific topology, hardware and protocols used.

Returning to FIG. 1A, a user such as USER1 is connected to a server such as Server1 by a local network represented by line 102. This local network, which may be, for example, an Ethernet, is different from the Internet and is characterized by increased bandwidth and customized fast routing among the users in the group or organization attached to it. Multiple users connected to such a local network are illustrated at 104. Although the users and servers attached to the local network may be distributed over a large territory, they are referred to as "local" to each other for purposes of this document. Thus, USER1 communicates with Server1, which is USER1's local server, over local network 102.

Server1, in turn, transfers information to the Internet 106 routers over a structure known as a "backbone," indicated by line 108. The types of computers, hardware, interconnections, etc. are not critical to an understanding of the present invention. Other local servers, such as Server2, Server3 and Server4, are all connected to Internet routers 106 to collectively form the Internet 100. Each of the servers and user computers can include computer resources such as processors and memory and can transfer data among one other.

FIG. 1B shows a typical computer 10 such as would be operated by a user on the Internet. Computer 10 includes a cabinet 12 housing familiar computer components such as a processor, memory, disk drive, Compact Digital Read Only Memory (CDROM), etc. (not shown). User input devices include keyboard 16 and mouse 18. Output devices include display 20 having a display screen 22. Naturally, many other configurations of a computer system are possible. Some computer systems may have additional components to those shown in FIG. 1B while others will have fewer components. For example, server computers need not have attached input and output devices since they may only be accessed from time to time by other computers over a network. Human interaction with such a server computer can be at another computer that is equipped with input and output devices. Input and output devices exist in many variations from those shown in FIG. 1B. Displays can be liquid crystal displays (LCD), computer monitors, plasma, etc. Input devices can include a trackball, digitizing tablet, microphone, etc. In general, use of the term "input device" is intended to include all possible types of devices and ways to input information into a computer system or onto a network. Likewise the term "output device" includes all possible types of devices and ways to output information from a computer system to a human or to another machine.

The computer itself can be of varying types including laptop, notebook, palm-top, pen-top, etc. The computer may not resemble the computer of FIG. 1B as in the case where a processor is embedded into another device or appliance such as an automobile or a cellular telephone. Because of the ever-changing nature of computers and networks, the description of hardware in this specification is intended only by way of example for the purpose of illustrating the preferred embodiment. Any distributed networked system capable of executing programmed instructions is suitable for use with the present invention.

FIG. 1C shows subsystems of the computer of FIG. 1B. In FIG. 1C, subsystems within box 40 are internal to, for example, the cabinet 12 of FIG. 1B. Bus 42 is used to transfer information in the form of digital data between processor 44, memory disk drive 48, CDROM drive 50, serial port 52, parallel port 54, network card 56 and graphics card 58. Many other subsystems may be included in an arbitrary computer system and some of the subsystems shown in FIG. 1C may be omitted. External devices can connect to the computer system's bus (or another bus or line, not shown) to exchange information with the subsystems in box 40. For example, devices such as keyboard 60 can communicate with processor 44 via dedicated ports and drivers (shown symbolically as a direct connection to bus 42). Mouse 62 is connected to serial port 52. Devices such as printer 64 can connect through parallel port 54. Network card 56 can connect the computer system to a network. Display 68 is updated via graphics card 58. Again, many configurations of subsystems and external devices are possible.

Concepts

As a prelude to presenting higher level concepts of the invention, an example of a specific use of invention is first discussed.

In FIG. 1A, assume that USER1 desires to make available information about job candidates. In the present invention, USER1 would do this by creating a format for presenting the information. This format is more formally called a "data definition." The dated definition specifies a sequence of fields that have names. The fields, also called "attributes," each can be associated with a date of value of a predetermined type. This is similar to records in standard databases where Name/Value pairs are defined. Once the dated definition is complete, it is given a name. The name of the data definition in the example is "Job Candidate."

The job candidate data definition can then be filled in with values according to the defined attributes to create a job candidate "instance." FIG. 1A shows job candidate instance 110 identifying a specific job candidate. Note that job candidate instance 110 has attribute names on the left side of the rose and attribute values at the right side of the rose. The required types for each name/value pair are not shown in job candidate instance 110 but, for example, the attribute name "first name" assumes a character or string value "Jane." The attribute name "when available" assumes a date value (which can also be a text string) of"1-1-98." Any number of instances of the job candidate data definition can be created. This has similarities to object-oriented concepts where the data definition defines a class of objects and, once values are applied to the class definition, object instances are created.

Note that job candidate instance 110 is shown residing within Server1. In the preferred embodiment, the physical location of data definitions and instances is of little importance. In practice, there will often be multiple instances of the same data definition and data object. The preferred embodiment keeps track of "ownership" of data definitions and object instances. "Data Places" are also defined so that an organized information hierarchy is achieved as discussed in more detail below. For purposes of this introductory example, we omit the discussion of such aspects of the invention as ownership, access rights, security and persistence.

Next, assume that USER2 wishes to search for job candidates. The user can locate "places" where job candidate objects reside by using traditional methods such as the key word search engine. Since the present invention works within the existing framework of world wide web (www) sites and documents on the Internet, the user may simply go to a web site of a known entity which can direct the user to desire data objects much as a user on today's Internet is directed toward desired documents or other information. USER2 performs operations to access, collect, create, modify and distribute information objects with an application front and specific to the preferred embodiment of the invention and refer to as a "data browser." The data browser operates seemlessly with today's common Internet browsers such as Netscape Navigator™ and MicroSoft Explorer™. Once USER2 has been provided with the job candidate data definition or a job candidate instance, USER2 may make specific queries, or searches, based on the name/value pairs of the definition.

Not only can USER2, or any user for that matter, perform specific searches on job candidate instances, users may also post, or publish, their own instances of job candidate object. Regardless of where the instances physically reside, they will be searchable to anyone who has been provided with the job candidate data definition or a job candidate instance.

One may be begin to understand the power and utility of this system by noting that this scheme provides a controlled yet "open" architecture allowing information to be categorized not only by content but by knowledge of the controlling, or owning, entity.

For example, USER1 can be a job placement company or a well-known newspaper. Alternatively, USER1 may be an individual or a lesser-known company. By obtaining a data definition or instance from a known source, a user has some reassurance of reliability and quality of the information being retrieved. Also, the controlling source may charge for access, provide an infrastructure around the data or provide other value-added products and services associated with the data. Further, such value-added products and services can be provided by third parties who obtain the data definition or data instance as will become apparent in the subsequent discussion.

There can be other data definitions having the same name, "job candidates," which will not be accessed in a search based on the job candidate definition or job candidate instance 110 of FIG. 1A. Changes to a specific data definition are propagated among all instances of the data definition throughout the Internet. The ability to change access and publish to a specific data definition is controlled. Queries can be "persistent" so as to assume some of the characteristics of a publish-subscribe model. For example, USER2 may create a persistent query so that any new instances of the job candidate object showing a "when available" attribute value on or before a specific date are sent to USER2 immediately when such job candidate instances are created. Many other instances of applications of the basic concept of the invention are possible. In fact, this information processing model is so flexible that any application can be constructed within it.

Figure 2A:
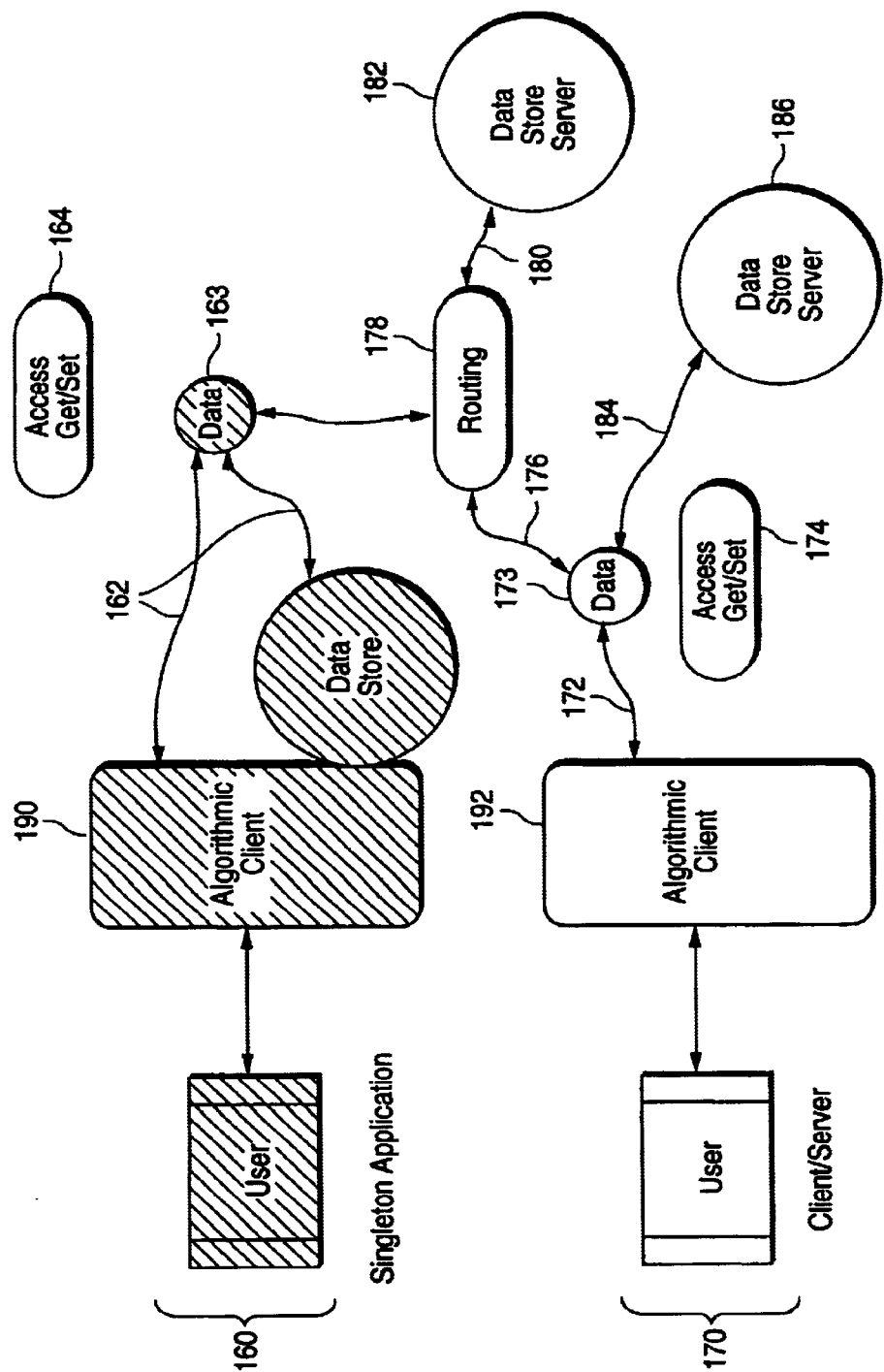
FIG. 2A shows the prior art models for information processing in networked computer systems.
Figure 2B:
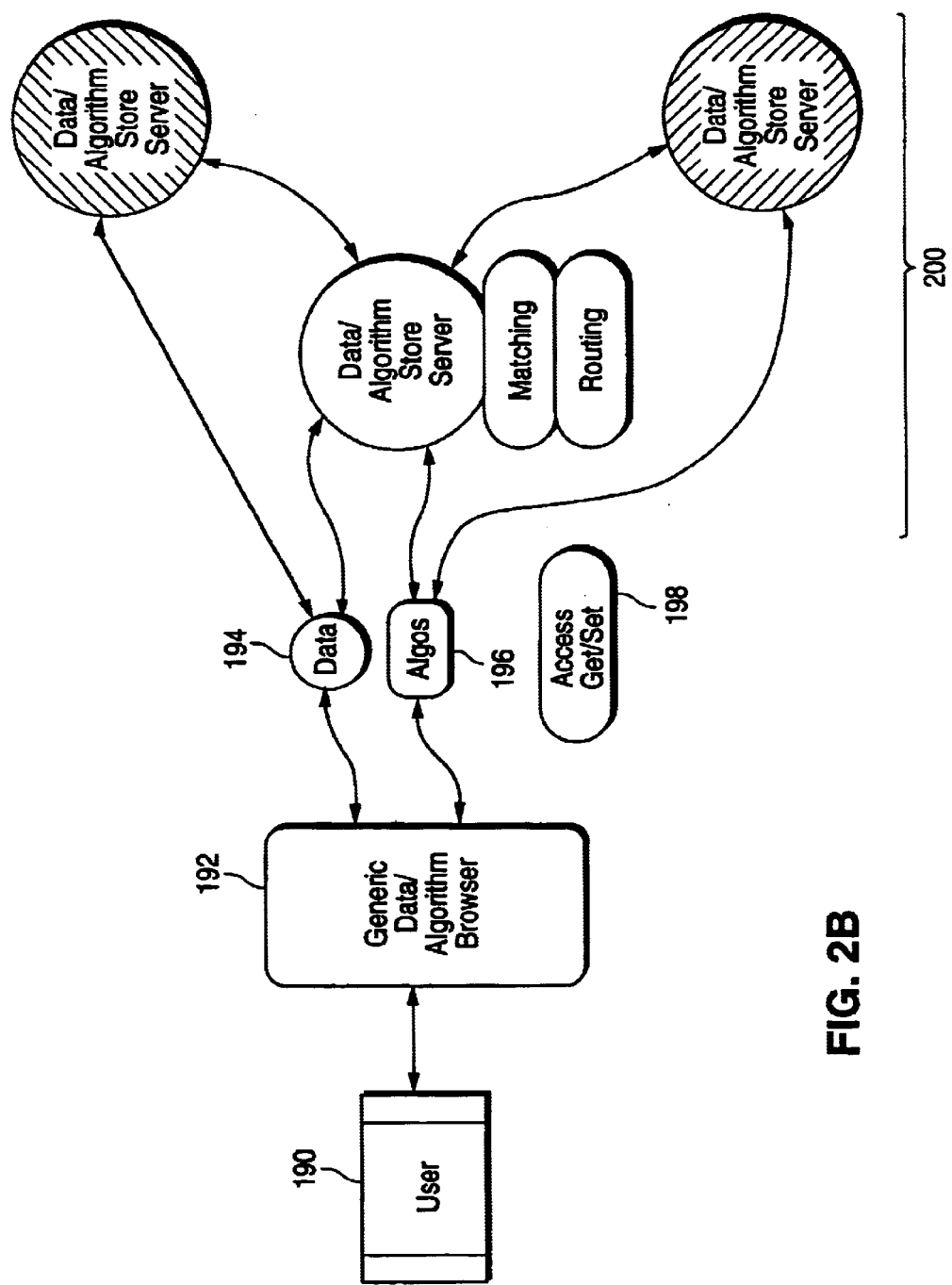
FIG. 2B shows a symbolic diagram of the information processing of the resent invention.

FIG. 2B shows a symbolic diagram of the information processing of the present invention.

In FIG. 2B, a user 190 interacts with data and algorithms at their local computers 192 such as a workstation or desktop computer. Unlike the prior art models shown in FIG. 2A, the information processing model of the present invention allows the user's browser to access, modify, collect, and distribute both data 194 and algorithms 196. The data and algorithms can be the subject of operations such as Get/Set 198 operations, and other operations not shown but discussed below. Data and algorithms are stored throughout networks, such as the Internet, represented at 200. As discussed in detail below, the information processing model of the present invention allows data/algorithm store servers to perform matching and routing functions. The user of the model of FIG. 2B provides greatly improved functionality, flexibility and efficiency as discussed below.

Concepts of the Information Processing Model

Each information object is characterized by three basic properties. These are data place, data definition and data value. A data place is a storage area within the network. Since the network is composed of many computers having their own local storage which can be internal or external storage devices, and these computer systems and devices each have their own ways of naming areas of storage local to them, the data place is uniquely identified within a network by a concatenation, or combining, of network-wide identifiers, device identifiers, directory identifiers, filenames, etc. The Internet's "World Wide Web" (WWW) portion uses place-naming standards according to the Hyper-Text Transfer Protocol (HTTP). With HTTP, Uniform Resource Locators (URLs) are unique identifiers and are a combination of "machine addresses" and paths within a machine to a data place. The machine addresses have "domain name" counterparts which are textual instead of numeric and are easier for users to remember. The URL provides a way to uniquely identify each datum, instruction or other item of information residing under the control of any computer or device in the Internet. Each data definition, data instance or algorithm (collectively referred to as "information objects") of the present invention resides in a data place on the network and can be uniquely referred to by processes of the invention.

In the system of the invention, information objects and other entities are said to be "named" when they possess either a number type unique id (optimal for matching) or a number-type symbolic name (optimal for access). The correspondence is always one-to-one. Such names are also generically called Context Assigned Differentiation Tokens or CADTs.

Figure 3:
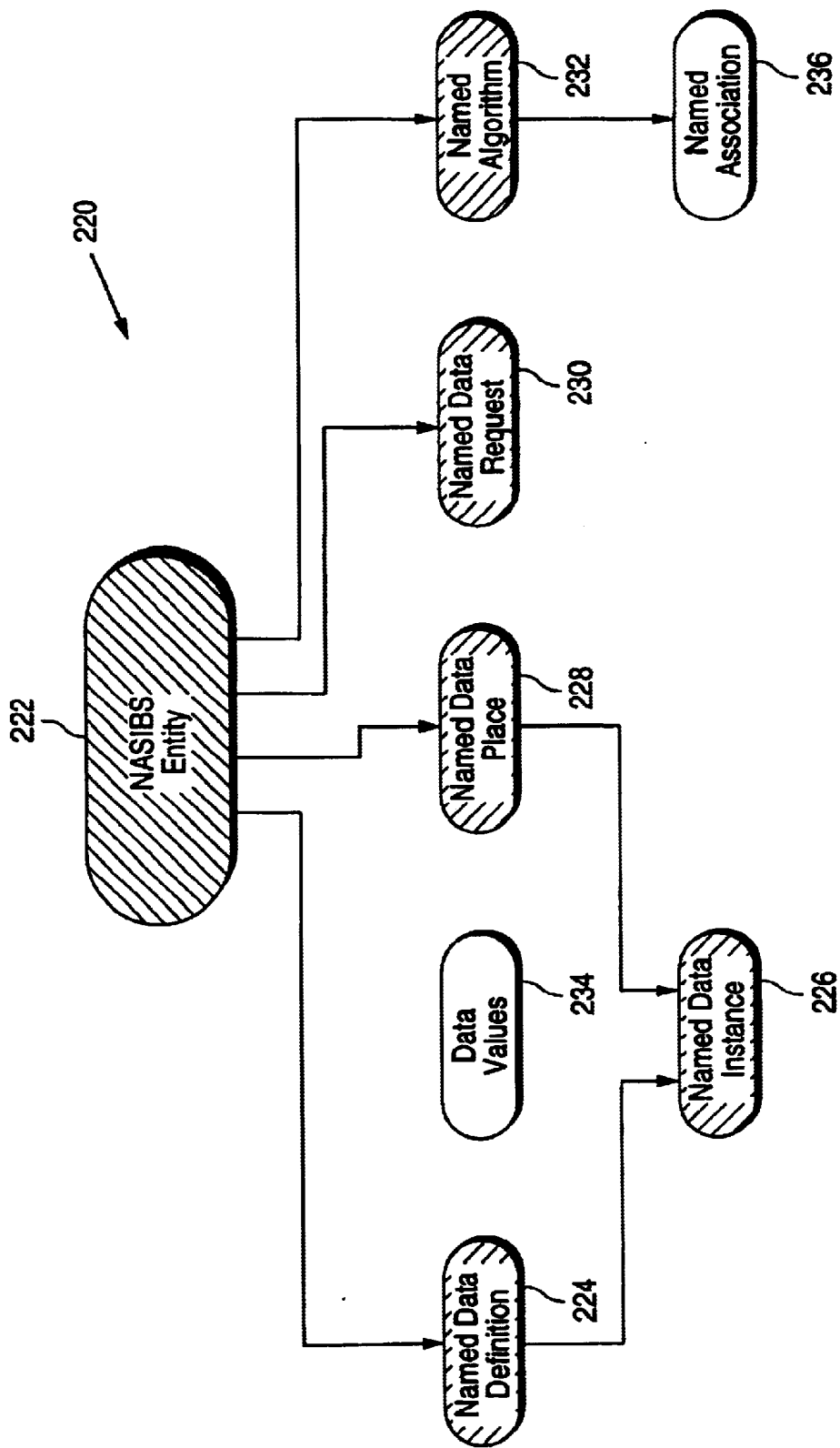
FIG. 3 shows a diagram illustrating five basic processing entities upon which the system of the present invention is built.

FIG. 3 shows diagram 220 illustrating five basic processing entities upon which the system of the present invention is built. These are Named Data Definition 224, Named Data Instance 226, Named Data Place 228, Named Data Request 230 and Named Algorithm 232. Other components such as Data Values 234 and Named Association 236 support the five basic processing entities. Intrinsic operations of the system employ these basic entities. Other data structures are either built using them or are custom in nature and external to the system.

A named data place is network addressable. Data places are named collections of data residing on a computer system or storage device that can store entities of any type and provide a distinct data input pathway and data output pathway. Data places can also be equated to network addressable subprocesses in traditional parlance. Data places play a very fundamental role in defining the system. A data place can be as small as the smallest possible contiguously addressable process on a given computer system and it cannot span multiple virtual address spaces. Within a data place references to instances of any entity are implicit. An example of a data place is a directory on a hard drive in a computer system. The data place is addressed in the Internet by using the URL format and providing a domain name to a machine, or storage space on a machine, and a path to the directory. A file is also a data place since it describes an area of storage in the network. Files are accessed using the domain name, path, and filename or file handle. Any network addressable space can be a data place.

A named data definition is network addressable. In the preferred embodiment such a definition is made up of a set of typed attributes (i.e., Name/Value pairs representing data or algorithms) including other nested data definitions. This is implemented as a language data structure comprising at least one list structure capable of storing and retrieving named variables of any of the underlying language supported types. Minimum implementation of the data definition should provide the features shown in Table I, below.

TABLE I

| Data Place Name | String representing symbolic name of the owner data place. (CADT in name space of data places) | | | |
|---|---|---|---|---|
| Data Definition Name | String representing symbolic name of the data definition. (Unique in the name space of the owning data place) | | | |
| Ver # | Incrementally assigned for differing mutations of same data definition in holding data place. (CADT in the name space of the owning data place and data definition) | | | |
| System Modifier Flags | Activation Status. (More) | | | |
| Host Algorithm$_1$ | Arbitrarily associated algorithm. | | | |
| ... | ... | | | |
| Host Algorithm$_n$ | Arbitrarily associated algorithm. | | | |
| Instance Name | Incrementally assigned for differing instances of same data definition in holding owning space. | | | |
| Attribute Order Number$_0$ | (CADT in the name space of the holding data place and data definition) | | | |
| Attribute Order Number$_1$ | Type | Name | Value | System Modifier Flags (32 Bits) |
| ... | ... | ... | ... | ... |
| Attribute Order Number$_n$ | Type | Name | Value | System Modifier Flags 932 Bits) |
| User Space | | | | |

TABLE I

A named data definition can exist only in a named data place. Hence it is a two-dimensional entity [data place, date definition]. Data definitions can be created only in association with data places and are assigned CADTs by their owner data place. Data definition changes within owning data places are incrementally numbered based on the chronological order of the changes. Differing versions of the same definition always follow these rules:

Attributes can be added and deleted but not updated in any of the characteristics of an attribute e.g., type.

Any data definition version or related instance with a sequence number lower than any other can be treated transparently as one of a higher number.

$DD_n = DD_m$ if $n <= m$

Any data definition version or related instance with a sequence number higher than any other can be treated transparently as one of a lower number with truncation of absent fields.

Attributes added can be deleted, but attributes deleted cannot be recreated.

Any singular data place cannot contain multiple version numbers of the same data definition.

Data definitions are used to create instances of the definitions. For example, a data instance such as the "Job Candidate" instance of FIG. 1A is created with a data definition that does not include values—merely attribute names and types for the values to be bound to the definition at a later time. Data definitions bind (assume unambiguous equivalency to) with specific sets of corresponding values to form distinct instances. Attribute names act as the rendezvous token while binding data values to data definitions and for the purpose of equivalency determination discussed in more detail below. Such sets are logically referred to as data values, such as data values 234 shown in FIG. 3. Data values do not physically exist by themselves but are supporting data that bind to a data definition (which is created in association with a data place) to result in a data instance as shown diagramatically in FIG. 3.

A named data state interest request (or Data Request) is network addressable. This request is an ordered specification of one or more dimensions of data namely [data place, data definition, data value], where data place and data definition are straight single-value equivalency specifications and data values specifications are in the form of conditions on one or more of the attributes including the CADT (which is treated as any other attribute). The resulting set's size is determined by the number of matching occurrences. Data requests can be created only by data places and are also assigned CADTs by their owner data place. An example of a data request corresponding to the example discussed above in connection with FIG. 1A is a query for [Server1, Job Candidate, "When available" =AFTER 3-6-98]. Data requests have the same logical structure as a data definition except for the extra condition specification as shown in Table II.

TABLE II

| Data Place Name | String representing symbolic name of the owner data place. (CADT in name space of data places) | | | | |
|---|---|---|---|---|---|
| Data Definition Name | String representing symbolic name of the data definition. (Unique in the name space of the owning data place) | | | | |
| Ver # | Incrementally assigned for differing mutations of same data definition in holding data place. (CADT in the name space of the owning data place and data definition) | | | | |
| System Modifier Flags | Activation Status. (More) | | | | |
| Host Algorithm$_1$ | Arbitrarily associated algorithm. | | | | |
| ... | ... | | | | |
| Host Algorithm$_n$ | Arbitrarily associated algorithm | | | | |
| Instance Name | Typed Condition | Incrementally assigned for differing instances of same data definition in holding owning space. (CADT in the name space of the holding data place and data definition) | | | |
| Attribute Order Number$_0$ | Specification (Equal to) | | | | |
| Attribute Order Numbers$_1$ | Type | Name | Typed Condition | Value | System Modifier Flags (32 Bits) |
| ... | ... | ... | ... | ... | ... |
| Attribute Order Number$_n$ | Type | Name | Typed Condition | Value | System Modifier Flags (32 Bits) |
| User Space | | | | | |

Interest request specifications can be set across one or more of the data state dimensions; namely, (data place, data definition, data value) by any data place. Lesser dimensions are valid following the rule that Data Request specifications of dimension n always include choices for previous dimensions, where the dimensions are numbered as follows:

Dimension1: Data Place
Interest Request=(source data place).f(data place)
Request for complete replication.

The above interest request results in all instances of all data definitions in the data place being returned.

Dimension2: Data Definition
Interest Request =(source data place).f(data place, data definition)
Request for definition replication.

The above interest request results in all instances of the data definition in the data place being returned.

Dimension3: Data Value
Interest Request=(source data place).f(data place, data definition, data value) Request for conditional instance replication.

The above interest request results in all instances of the data definition in the data place that meet the data value query being returned.

Interest request specifications can be made persistent by naming them. Such persistent requests are uniquely identifiable using the owner data place assigned ID.

Named data instances are network addressable. This is a populated occurrence of a data definition and data request in any data place. Data instances get their names from the CADTs assigned to them by their owning data place. Data instances can, as a result, be queried on either the values or the unique ID This CADT completely supercedes the data values of the instance for the purpose of equivalency determination. A named data instance can occur only in a named data place for a named data definition. Hence it is a three dimensional entity [data place, date definition, data value].

A named algorithm is network addressable. An Algorithm can be merely a string of bytes, which can do meaningful work with fully defined data, hence functioning as associations between these data. Algorithms do not require a specific data place to exist. The simplest form of an algorithm could be a constant value, which may represent some semantic value to another algorithm, said algorithm then acting as a parametrizable algorithmic template. Algorithms can thus be seen as made up of templates and constants. Such a token can be seen as a simple association. (An examples of a token could be 'contains' and a template could be 'resolve containment'.)

Processing Tenets

The system builds upon the following basic processing rules, which are called processing tenets. Intrinsic operations of the system employ these and only these specifications of data structures and sequences of instructions. All other data structures and processing mechanisms are either built using them or are custom in nature and external to the system:

The system basically deals with creating multiple data places and managing them. Management here is in terms ensuring that data definitions across places are always synchronized and data instances across places are always conditionally synchronized. This represents the intrinsic functionality of the system, it can be extended to any degree using external algorithms which provide meaningful service applications built on top of a given data place. These are called Data Place Applications (DPAs). As will be shown later, the ability of DPAs created by an independent user or company that manipulate data definitions created by another user or company provide an "open" system that lends itself to efficient commercial uses.

Intrinsic and application algorithms can interface with the system data by two means. The first is Time Based Periodicity where the algorithm obtains information from the system, such as the synchronizing of data definitions and data instances, at predetermined periods of time. The second manner of interfacing allows the algorithm to be notified whenever there is any change in information of which the algorithm needs to be aware. The "on change" approach is obtained by the algorithm by submitting a Data Request to the system.

Algorithms cause processing which can be one of three types: (1) data creation; (2) data assignment, further changes in the value dimension of data state; or (3) data movement, further changes in the place dimension of the data state. Such changes then cause further processing.

The system finally provides for two kinds of inherent process addressabilities, an Inner NASIB process and an Outer NASIB process. The Inner NASIB Processes gain network addressing characteristics just by virtue of beginning execution. They are aware of the data place naming scheme and are always listening for requests on well-defined network byte transfer ports. Outer NASIB Processes gain network addressing characteristics by explicitly knowing the address of at least one Inner NASIB Process.

Data places share hierarchical relationships among themselves, as mentioned. These relationships, however, are purely for addressing purposes. The data places are free to maintain independent data relationships (data definitions and data instances) with as many data places as desired, as long as each of them is addressable. Hence data places maintain two kinds of relationships: addressing and data. Each of these relationships can mutate completely independent of the other. Further, every data place has to provide at least one generic communication port for incoming and outgoing traffic.

A data place, therefore, always needs to be parented off one, and only one, other data place. Although the system is very dynamic and allows the continuous creation, destruction and modification of data places by users, along with access grants to the data places, there are some special data places which are integral to the system's functioning. For example, the Root Data Place is the main node for sprouting the rest of the system's place hierarchy.

Figure 4:
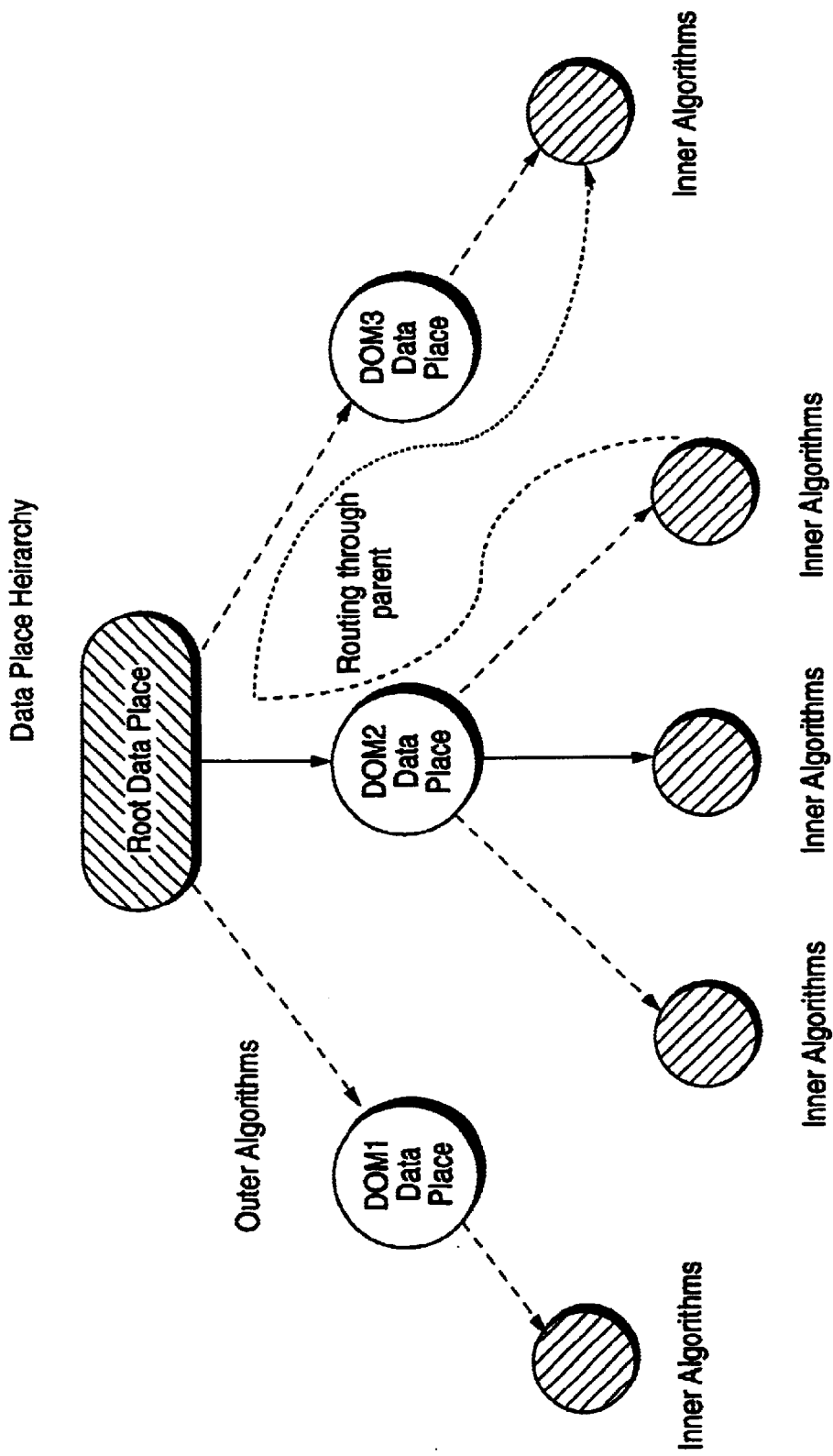
FIG. 4 is a diagram showing the data place hierarchy based around a root data place.

FIG. 4 is a diagram showing the data place hierarchy based around root data place 250. The root data place requires no parent, and is an abstract space where no entities can actually reside. It refers to the collective knowledge domain of all NASIB processes existing on a connected computer network. The root data place is subdivided into domain data places, each of which could possibly be thought of as a NASIB server process. A domain data place is always directly network addressable and discoverable. Within a domain data place can exist as many named data places as required, each parented from a domain data place or a direct or indirect descendant of it. A named data place is always addressed through a domain address space.

Data places assign unique IDs (i.e., CADTs) to the core entities of data definitions, data instances and data requests. In this manner, data is associated with an owning, (or, conceptually equivalent, controlling and creating) data place. Since the data place, itself, is associated with a user or machine, the ultimate control over core entities, and categorization of those entities, can be traced to a user or machine. The ability to categorize and handle data with respect to data places is a powerful tool in allowing a user to identify, collect and publish data and algorithms as will be shown in the examples below.

Figure 5:
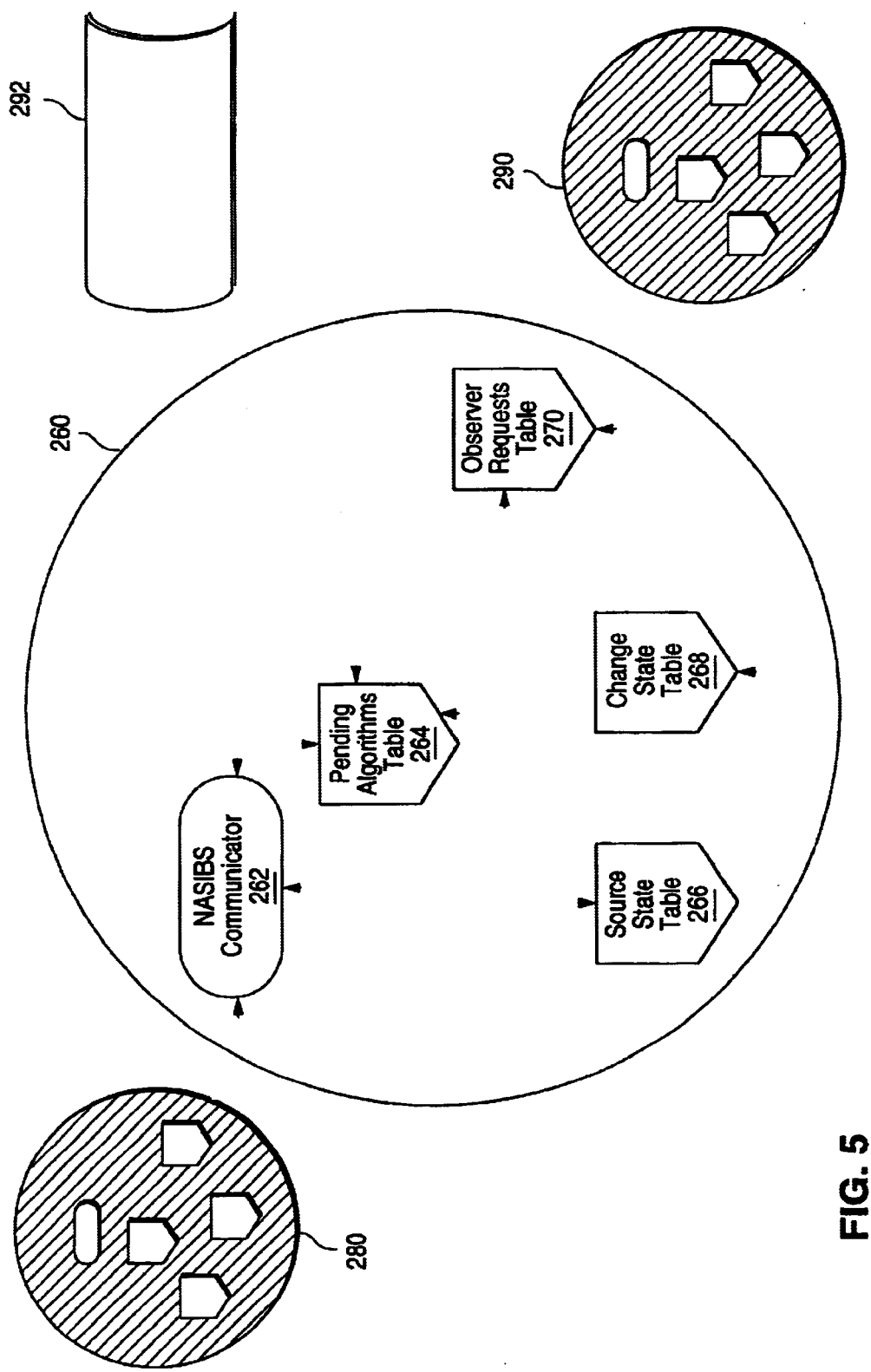
FIG. 5 shows the five types of components always maintained by a data place.

FIG. 5 shows the five types of components always maintained by a data place. The components within data place 260 are NASIB communicator 262, Pending Algorithms Table 264, Source State Table 266, Change State Table 268 and Observer Requests Table 270. The NASIB communicator is a core algorithm which facilitates the transfer of the byte set to or from the requesting data place in response to a given NASIB communication specification. In effect, this is the communication port of the data place. The Pending Algorithms Table is a logical table representing a queue of tasks for the data place. The Source State Table is a logical table representing all the data instances in the data place organized typically by data definitions. The Change State Table is a logical table representing the list of changes applied to the source state table. Changes become part of the current state (or are deleted) when all resultant algorithms have marked it as no longer of any interest. The Observing Requests Table is a logical table representing the list of observer algorithms on the change state table. Other data places have their own components as illustrated by data places 280 and 290. An application represented at 292 performs operations on data at the Data Places by invoking the NASIBS communicator which uses the four tables to perform the operations. It is possible for multiple data places to share one or more of the state tables.

Data places need to provide the following six local manipulation operations: (1) Create Data Definition; (2) Update Data Definition; (3) Delete Data Definition; (4) Create Instance given data definition; (5) Update Instance given data definition and instance ID (CADT); and (6) Delete Instance given instance ID (CADT).

Data places need to provide access operations such as (1) Get Data Definition given definition name, (2) Get Data Instance given data definition and instance ID (CADT), and Get Data Instance given data request.

Data places need to provide the following three kinds of synchronization operations:

1) Every instance of a new data definition that enters a data place results in a data request being generated on its definition in the owner data place. This algorithm is called the Default Definition Synchronizer Algorithm. It needs to be provided by every participating data place. This could be a singleton function. This function is like a Take Data Definition.

2) Data between any two data places is always exchanged based on data requests between them. There should be an algorithm to synchronize contents with another data place based on a data request. A persisted data request performs this function. This algorithm is called the Default Value Synchronizer Algorithm. It deletes all instances satisfying the data request in itself and inserts into it all instances satisfying the data request from the source data place (named instances as a result are automatically updated). There can be multiple instances of these.

3) A special case of the above kind of synchronization function is the Default Instance Synchronizer Algorithm, which is a data request using Instance Equivalency. This needs to be provided by every participating data place. This is a singleton function and is common enough to be considered intrinsic. This function is like a Take Data Instance Set.

Figure 6:
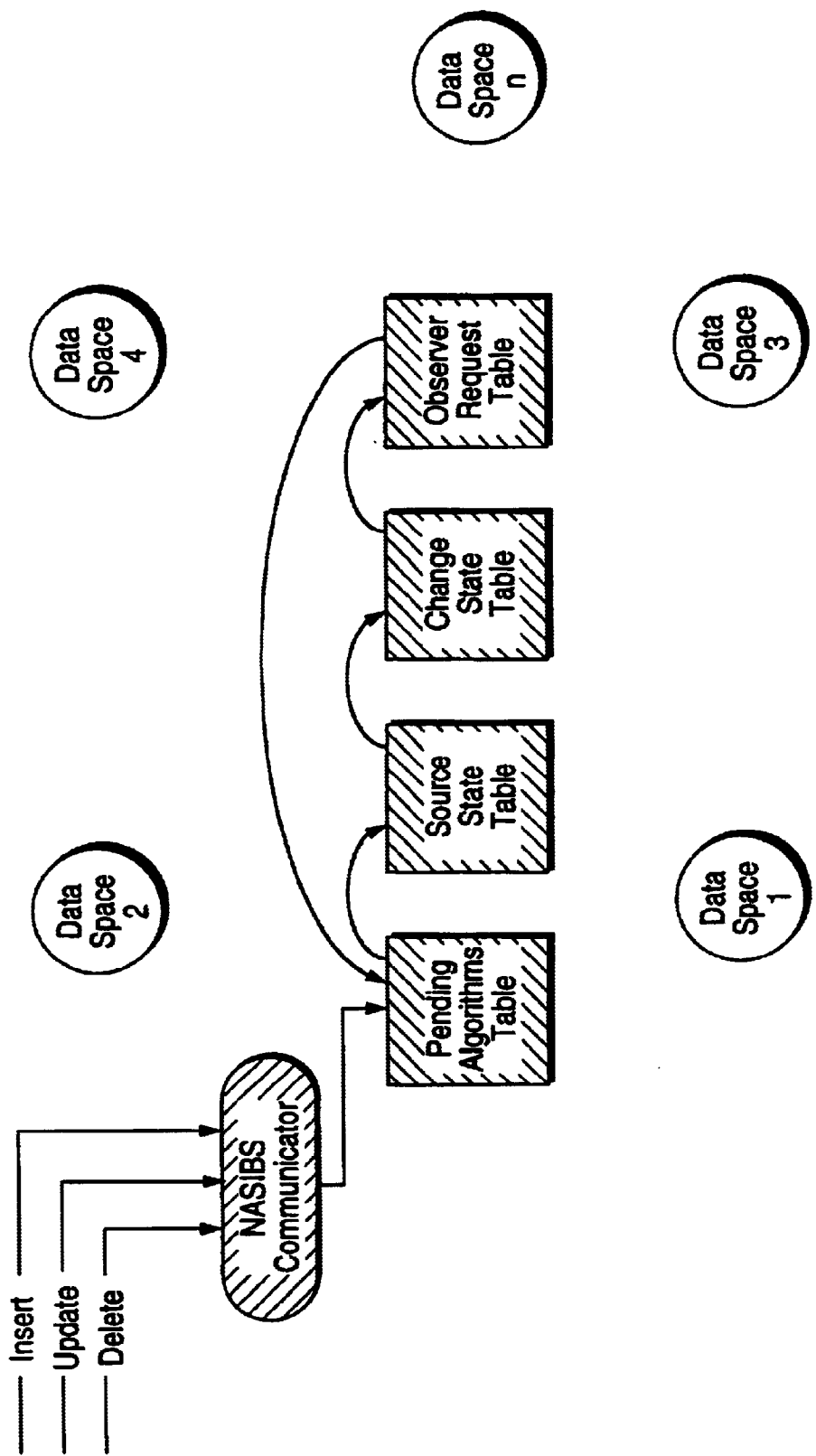
FIG. 6 shows tables shared among data places.

FIG. 6 shows tables shared among data places (or "spaces") as "Pending Algorithm Table," "Source State Table," "Change State Table" and "Observer Request Table."

Formal State Tables of the System

Intra Data Place and Inter Data Place operations are governed by the following state tables shown as Table IIIA and Table IIIB, below.

TABLE IIIA

| | Data Instance | | | | | |
|---|---|---|---|---|---|---|
| | New/Create | | Update by CADT | | Delete | |
| Owner | $Space_N$ | $Space_M$ | $Space_N$ | $Space_M$ | $Space_N$ | $Space_M$ |
| $Space_N$ | Yes Become Owner Run Algorithm$_A$ | No Import By Data State Int. Request | Yes Run Algorithm$_B$ | No Request Source By Data State Int. Request | Yes run Algorithm$_C$ | No Request Source By Data State Int. Request |
| | Data Definition | | | | | |

TABLE IIIB

| | New/Create | | Update by Name | | Delete | |
|---|---|---|---|---|---|---|
| Owner | $Space_N$ | $Space_M$ | $Space_N$ | $Space_M$ | $Space_N$ | $Space_M$ |
| $Space_N$ | Yes Become Owner Run Algorithm$_D$ | No Explicit Give Data Definition Synchronize | Yes Run Algorithm$_E$ | No Request Source | Yes Use Algorithm$_F$ | No Import Request Source |

Figure 7:
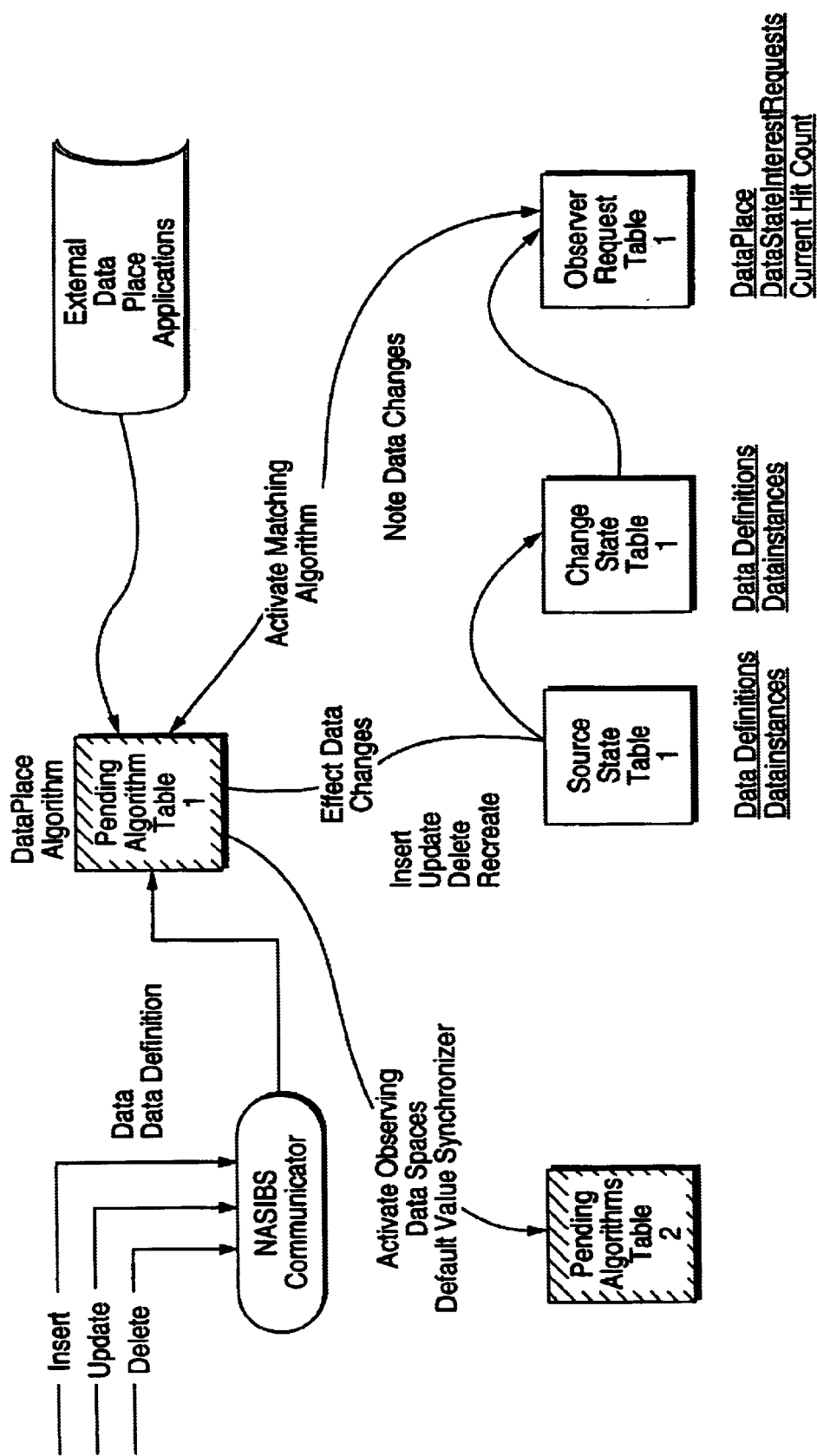
FIG. 7 shows relationships between tables in diagram form.

FIG. 7 shows some of the relationships of Tables IIIA and IIIB in diagram form.

Table IV lists rules that are followed by the system in handling data definitions, instances and processes.

Definitions are always owned by data the place creating it.

Whenever import of named definitions (through explicit "get") occurs across data places DDSA is installed. Once imported, any update requests on foreign data definitions are simply redirected by the operating data place to the owning data place; self-update takes place through the DDSA.

An attempt to double delete a definition is not possible.

Data instances are always owned by the data place creating them, whether the definition is local or imported.

Whenever import of named instances ("query," as in traditional parlance is not an import) occurs across data places DISA is installed. Once imported any update requests on foreign data instances are simply redirected by the operating data place to the owning data place, self-update happens through the DISA.

An attempt to double delete instance is a null operation.

Data always comes into a data place by virtue of local creates or inter-data-place imports; no direct copy can be done.

TABLE IV

Note that multiple implementations are possible for the methods of the present invention disclosed in the source code involving various sequences of operations, concurrency strategies, locking strategies and optimization strategies. The basic steps represent the broad logical requirements of any implementation. For a detailed description of the workings of the algorithms the Source Code Appendix should be consulted.

| Algorithm | Sequence of Steps |
|---|---|
| A | 1. Add Instances to definition-specific source state table.<br>2. Mark all changes in singleton state change table.<br>3. Assemble all data requests as per foreign data place and data definition.<br>4. Run all resultant data requests and compare previous $Count_P$ and new $Count_N$. If $Count_N - 0$ $Count_P >$ generate an Add : Data Instance for the respective data place.<br>5. Factor out common data instances by data place.<br>6. Dispatch to NASIB Communicator. |
| B | 1. Add Instances to definition specific source state table.<br>2. Mark all changes in singleton state change table.<br>3. Assemble all data requests as per foreign data place and data definition.<br>4. Run all resultant data requests and compare previous CountP and new CountN If CountN − CountP > 0 mark change as a Add : Data Instance for the respective data place.<br>5. Run all resultant data requests and compare previous CountP and new CountN. If CountN − CountP < 0 mark change as a Del : Data Instance for the respective data place.<br>6. Run all resultant data requests and compare previous CountP and new CountN. If CountN − CountP = 0 generate an Upd : Data Instance request for the espective data place.<br>7. Factor out common data instances by data place.<br>8. Dispatch to NASIB Communicator. |
| C | 1. Delete instance from definition-specific source state table.<br>2. Mark all changes in singleton state change table.<br>3. Assemble all data requests as per data place and data definition.<br>4. Run all resultant data requests and compare previous CountP and new CountN. If CountN − CountP < 0 generate a Del : Data Instance request for the espective data place.<br>5. Factor out common data instances by data place.<br>Dispatch to NASIB Communicator. |
| D | 1. Assign first version number for data definition.<br>2. Create data-definition-related source state table. |
| E | 1. Assign new version number for data definition.<br>2. Effect data definition change by creating new table with updated version number.<br>3. Assemble list of DDSAs from foreign data places.<br>4. Generate an Upd: Data Definition request for each data place.<br>5. Dispatch to NASIB Communicator. |
| F | 1. Delete data-definition-related source state table.<br>2. Assemble list of DDSAs from foreign data places.<br>3. Generate a Del : Data Definition request for each data place.<br>4. Dispatch to NASIB Communicator. |

Note that these algorithms involve only the five processing entities and the five logical components of each Data Place: Source State Table, Change State Table, Observer Requests Table, Pending Algorithm Table and the NASIB Communicator. The three kinds of operations on a data definition and on data instances are Add, Update and Delete. Permissibility is determined by the rules in an access table. The three kinds of operations permitted on data instances are Add, Update and Delete. Permissibility is determined by the rules in an access table. Operations and data storage are organized as per the data definitions involved, though heterogeneous implementations are possible using multiple serialization techniques, or other techniques.

The Change State Table and the Observer Algorithm Table should always be locked by any concurrent thread for the entire period of operations, since both the tables are subject to internally dependent writes. The Observer Requests Table always keeps a current "satisfaction count" for itself as per each unique named data request. The algorithms executed from the Pending Algorithm Table typically deal only with the Source State Table and the Observer Request Table, never with the Change State Table. External Algorithms also suffer the same restrictions.

Discrete distributed processes following these principles and techniques include these basic steps and tenets combined with higher level semantics, discussed immediately below, to form a data stream routing "super" system and application delivery and hosting framework.

Physical Sample Implementation

This section of the disclosure describes rules and protocols present in the system of the present invention. Any system capable of supporting all of the features of the preferred embodiment will adhere to at least these rules and protocols. However, other rules and protocols can be defined that would result in a capable system while being incompatible with a system following the rules and protocols below. This section merely provides one example of a high-level design blueprint for creating a specific embodiment of the invention.

Basic NASIB systems deal with any process connected over distributed networks. Any process could be acting as a client or a server, or for that matter, both. However, for the purpose of this discussion, usable forms of this system can easily be built using the following higher level semantic modules: (1) A NASIB Server which is essentially a data place differentiator, synchronizer and manager. A NASIB server process should be an inner algorithm and should be capable of hosting the core algorithms and should be able to embed the NASIB protocol. (2) A NASIB Protocol to link up processes and to provide both synchronous and asynchronous data and algorithm communication facilities. (3) A NASIB Client, which is any application that can communicate with one or multiple NASIB servers using the NASIB protocol providing human or machine usable services. To be a NASIB client a process should be an outer algorithm and must be able to embed a NASIB protocol stub.

A NASIB Server has the properties listed in Table V, below.

NASIB Server

Data places are mapped onto complete hosts (Domain Server), processes (Named Data Places) within a host or specific data structures (if the language supports it) within a process and can have a hierarchical relationship with one another. Every domain server has a Root Entity.

A human user is looked upon as an externally driven algorithm associated with a recognizable implicit data place. Access control mechanisms are totally orthogonal to the rest of the system.

Entities on a server which are visible to a human user can be organized into easily navigable hierarchical trees with completely flexible nested associations.

The user drives his or her physical client algorithm through hardware traps to interact with entities of this entity tree.

Using the data definitions and specifying his or her interests data place or places the user can query for existence of data satisfying values and place conditions. The user can also set data request events based on data value equivalency or data place equivalency.

Satisfactory data instances could be returned as discrete self-describing objects each representing a distinct state or the same states over the constraints of the interest request. Such instances can be carried through canonical messages.

The server gets its functionality by virtue of two kinds of algorithms.

Implicit algorithms, which are consecutive sequential instructions that get their context from being together when the server begins execution.

Arbitrary algorithms loaded over the network on-demand and dynamically linked to a virtual address space. Traditional processes extend functionalities by spawning other processes and communicating with them.

The client can then build its functionality by again executing algorithms of two kinds:

Implicit algorithms, which are consecutive sequential instructions that get their context from being together when the client begins execution.

Arbitrary algorithms loaded over the network on-demand. These data-to-algorithm associations could be part of the served data.

TABLE V

NASIB Protocol

The NASIB Protocol is an application layer protocol which can be implemented on top of one or many lower level protocols or their combinations. The NASIB Protocol essentially facilitates the transfer of NASIBs between NASIB processes over distributed connected networks; either server-to-server or client-to-server. Such a protocol should deal only with the NASIBs entities and provide a multiplicity of call interfaces and convenience collections.

The NASIB protocol has the following protocol stack primitives shown in Tables VI and VII:

TABLE VI

| Code | Name for |
|---|---|
| ENT | Entity Symbolic Name |
| DOM | Domain Name, any name space segmentation identifier |
| CON | Connection Name |
| DSN | Data Definition Symbolic Name |
| LSN | Algorithm Symbolic Name |
| INS | Instance Symbolic Name |
| DVS | Data Value Symbolic Name |
| RNM | Request Symbolic Name |
| DSP | Data Place Symbolic Name |

| Protocol Primitive | Operands | Return | NASIB Client | NASIB Server |
|---|---|---|---|---|
| Data Place Communicator Operations | | | | |
| Connect | Domain Name | Named Connection(s) | Yes | Yes |
| Disconnect | Connection Name | Void | | |
| CreateDataSpace | Data Place Name | Void | | |
| Data Definition Operations | | | | |
| NewDataDefinition | Definition Name | Definition Name | | |
| GetDataDefinition | Definition Name, Association Name | Named Definition(s) | Yes | Yes |
| SetDataDefinition | Definition Name | Definition Name | | |
| delDataDefinition | Definition Name | Void | | |

TABLE VII

| Data Instance Operations | | |
|---|---|---|
| NewDataInstance | | |
| GetDataInstance | Instance Name | Named Instance |
| SetDataInstance | Instance Name | Instance Name |
| DelInstance | Instance Name | Void |
| | Request Name | |
| Data Request Operations | | |
| GetEquivalencyRequest | Request Name Association Name | |
| SetEquivalencyRequest | Definition Name Data Value Name Data Place Name | Named Request |
| DelEquivalencyRequest | Request Name | Void |
| DoEquivalencyRequest | Request Name | Void |
| SetDefaultDefSynchronizer | Data Place Name | Void |

NASIB Stream Client

A NASIB human usable client incorporates a definite number of graphical user interface (GUI) abstractions and operational pathways. The client has a typical Messaging and E-mail kind of paradigm and operates on a user's implicit data place. When each frame type in the NASIB protocol is seen as a self-describing canonical message the servers take on the nature of store-and-forward messaging servers, and the protocol streams between them, or between them and clients, are seen as messaging streams. These messaging streams are made up of just one kind of frame for each NASIB entity type. Further adding a higher level abstraction of message boxes where transport messages could be accumulated for a human user gives the system its E-mail like semantics.

A Human Client Process is a generic object container acting like an imitator client with no native intelligence about the knowledge space. Loosely speaking, this means taking on the characteristics of any of the underlying client/server systems from multiple knowledge domains that it indirectly represents. Whenever users interact with entities in a NASIBs-based system the order of interaction is always enumerated as follows:

A. Locate Named Definition in Target Named Space

Some of the entities on a server are considered visible to an end user, these are called user entities. A user cannot interact with all information at the same time, so he needs to locate 'what he is looking for' using an organization system, which gives him a reusable indexed navigation structure. This navigation structure always starts from the root entity of the server. Users can traverse any GUI manifestation (example tree) of this entity set to get to the entity of interest. Further this navigation mechanism must meet the need of separating the transversal links from the actual objects so as to create two parallel systems of links:

Links to transverse to a particular object

Logical interclass relationships between objects

Each parallel system can then mutate independent of the other.

B. Activate Named Definition

Activating a user entity refers to performing any of a set of operations that can be done on a user entity, causing it to be executed with one of three relevant associated host algorithms:

Definition Viewer

Instance Viewer

Collection Viewer

Figure 15:
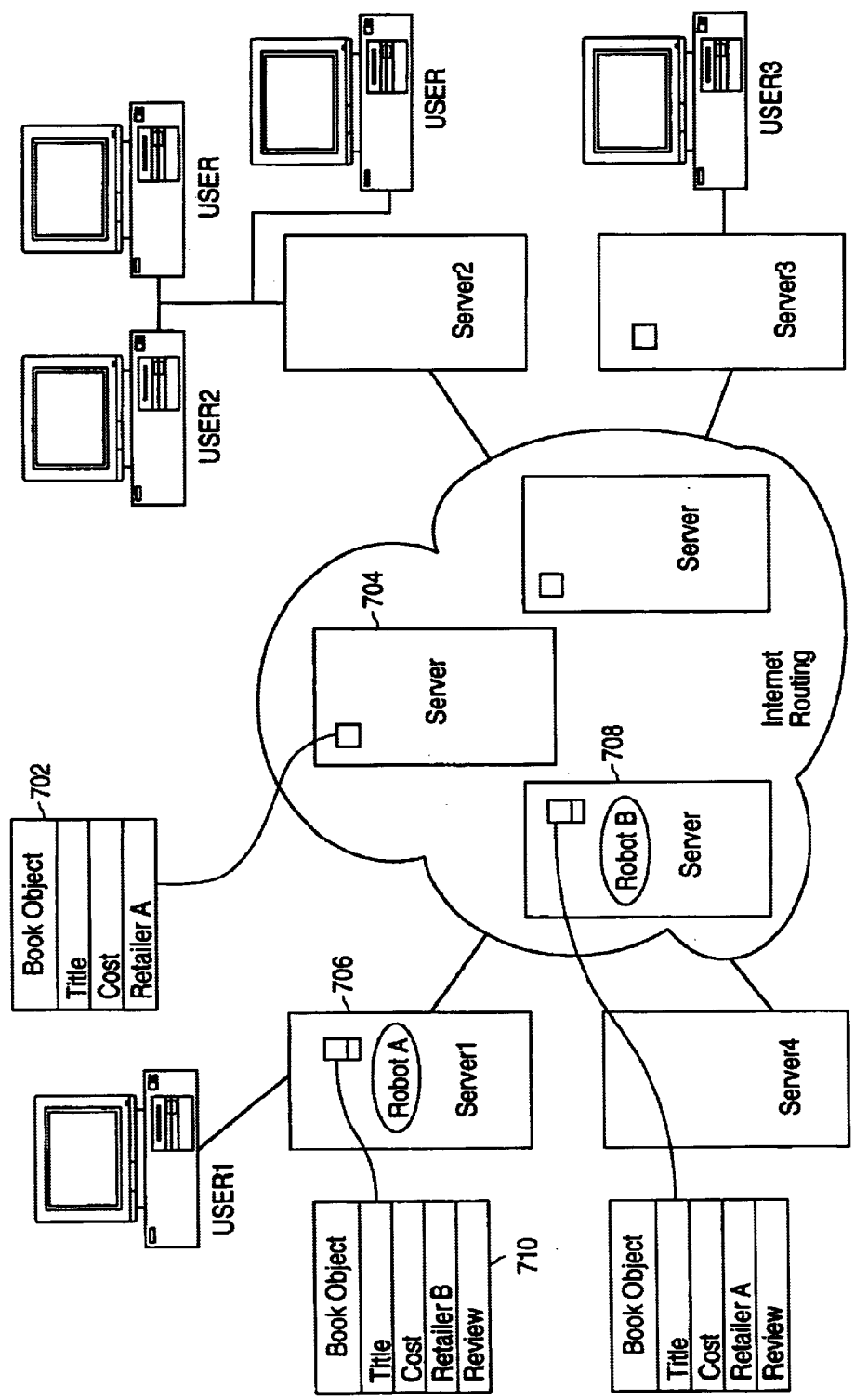
FIG. 15 shows an example of robot processing.

The execution could result in:
  Creation of one or more data structures in the memory of the host process;
  Creation of a GUI object and its rendering; or
  Execution of another algorithm.
C. Manipulate Named Definition
  Once an instance of the entity is created, the user can manipulate the entity using the appropriate host algorithm. Such manipulations would include basic data interactions like getting and setting values or activating other GUI elements. This step could be considered optional.
D. Submit Entity against Data Place(s)
  A manipulated user entity is then submitted, causing one of the following five actions:
  Post Search Request: This refers to searching all relevant data places for instances of the data definition satisfying a set of data state equivalency equivalency requests against them.
  Post Store Search Request: This refers to creating a search specification and then persisting it against a data place or a set of data places. The system ensures that definitions and instances resulting from these searches are always synchronized with the rest of the system.
  Post an Instance: This refers to creating a specific binding of the data definition to compatible data values and submitting it to initiate processing in a target data place.
  Post a Definition Edit: This refers to creating a new definition or updating an existing definition and making it the effective definition of the entity from that point onward in the target data place.
  Execution of Custom Algorithm: This refers to just assigning data and control to another host algorithm.
E. Manipulate Named Instances
  Submission of Search Request or Store Search Request results in the return of a data instance set representing the match for the search request specification. Results of a search specification over target data places results in a set of instances grouped as collections. Instances are automatically passed on to the associated Instance Viewer and collections are automatically passed on to the relevant Collection Viewer.
Advanced Steps
Robots
  Robots can intercept message streams on behalf of users and do extra processing on them in their data places. Robots are like Common Gateway Interface (CGI) extensions to Web Servers in their ability to do processing at server locations. However, robots of the present invention also can perform processing at the client, or data source and have additional features as discussed below.
  In general, a robot is a process, processor or other device or set of instructions or commands, that operates on a pre-existing information object in the system of the present invention. The concept of allowing extended, or augmented, processing to occur on published, or otherwise defined, instances of information objects, provides great flexibility to the system. Also, such an approach provides many $3^{rd}$ party opportunities to provide services so that a rich market and Internet economy will be stimulated.
  FIG. 15 shows an example of robot processing.
  In FIG. 15, Book Object 702 is published by server 704. Book Object 702 includes attributes of "Title," "Cost" and "Retailer." The Book Object is available for end-users such as USER3. In the case where USER3 subscribes to, or otherwise requests or obtains the Book Object, the object is propagated via servers to USER3.

Some of the server computers may have a robot process executing local to the server computer. This is shown in FIG. 15 at server 706 and server 708 which execute "RobotA" and "RobotB," respectively. RobotB is a process that detects instances of book objects and augments the object by adding a text field attribute of "Review." The Review attribute includes a review of the particular book so that a prospective purchaser is provided with more information on which to base buying the physical book referred to by the Book Object or, perhaps, to buy a full-text book object corresponding to the Book Object. The augmented book object (containing the review text) can be obtained by other servers such as server 706. The augmented book object can then be further modified. Ultimately, the augmented Book Object 710 is obtained by an end-user, such as USER1.
  For example, in FIG. 15, book object 710 has been processed by RobotA on server 706 so that the retailer attribute value has been switched from "A," as shown in the original Book Object 702, to "B." This processing shows how information relating to commerce considerations can be handled by robots. For example, such a retailer switch can be to "localize" or identify the closest geographic retailer to a user making a purchase, to give business to a preferred retailer who has a relationship with the server operator, or for other reasons. Note that coordination, or knowledge among robots is not necessary. Also, a robot need not have knowledge of, or coordination with, the original publisher of the object in order to process, augment or modify the object. Thus, the approach of using robots provides an open architecture.
  However, coordination between robots, or between robots and other processes is also possible. For example, RobotA can communicate with RobotB so that each time a user obtains an augmented book object from RobotA's server that includes a review, a counter can be incremented at RobotB's server to keep track of how often the augmented book object has been requested. This can provide a mechanism for royalty payments or statistics gathering.
  Another example of using robots is where certain information in an object, or the objects themselves, need to be restricted. A robot can check for a computer's machine address on an approved list to "open" or "close" fields from that computer or user's view. This can take place when the robot is executing on a user's computer or is on a server that provides the objects to end users.
  Robots can be used to encrypt object information. Encrypted information can also be appended to objects so that, for example, each robot in a series of robots that processes an object can append information that is only readable by desired robots or processes. This can be used to track the migration of an object, or to transfer information between robots in a "piggyback" fashion.
Writing Dynamic Scripts
  This refers to writing programs representing NASIB system executable algorithms, which use variables of type entity. If the definition of the entity changes the program is transparently regenerated.
Data Browser User Interface
  Next, FIGS. 10–20 are discussed to disclose a preferred embodiment of a "data browser" implementation of the present invention. The data browser is a generic application for viewing information objects according to the system and architecture of the invention as described above. A specific application of the data browser uses object data definitions and queries to implement a utility customized for use by semiconductor hip design teams. This customized application of the data browser embodied as a software product called "ChipCast" is to be manufactured and distributed by MayaSoft Corporation of Sunnyvale, Calif. Although the ChipCast adaptation of the data browser is specifically designed to handle information processing among a semiconductor design team, it should be apparent that many applications of the data browser are possible. In fact, the data browser and the Internet information architecture discussed above, are so flexible that literally any application can run within the framework of the data browser, as will be discussed below.

Figure 8:
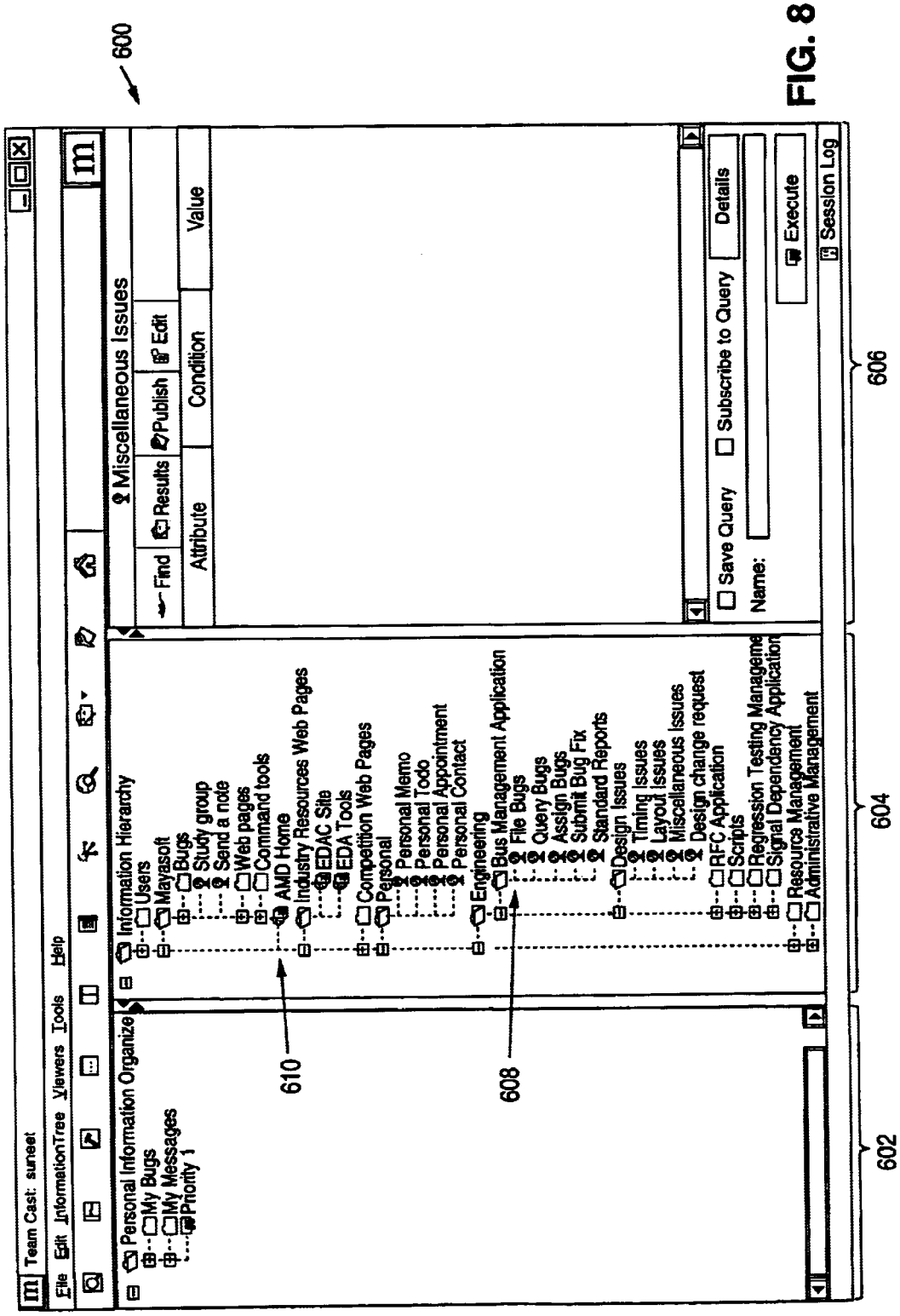
FIG. 8 shows a first user interface display.

FIG. 8 shows a first user interface display 600. The display shows three principal sections, namely, query window 602, information hierarchy window 604 and work area 606. Many of the controls shown in FIG. 8 are common among software applications familiar to users and, as such, their operation will be intuitive. For example, the user interface shown in FIG. 8 includes pull-down menus accessible at the top by clicking on the headings "File," "Edit," etc. Also present is a task bar for allowing quick access to specific functions as discussed below. Scroll bars, tab buttons, dialogue boxes, etc. all function as expected and as is commonly known in the art.

In FIG. 8, information hierarchy window 604 has a familiar folder and file "look" to it. However, although the folder icons operate in the traditional sense to hold and categorize information objects in a "tree" hierarchy, objects such as "File Bugs" shown at 608 are data definitions that are used to create additional instances of objects based on the data definition, search for object instances based on the data definition, and perform other functions on objects of the class defined by the data definition. Other objects such as "AMD Home" at 610 are Web page links. Still other information objects such as documents, files, programs, Web page links, commands, etc. are represented within information hierarchy 604 and are supported by the preferred embodiment data browser. In the future information object types can be added such as a video stream or file link, audio stream or file link, image link, etc.

From the view shown in FIG. 8, the user may use the mouse and pointer to "click" on any of the items shown in hierarchy window 604. For example, if the user clicks on a Web page, such as Web page 610, that Web page will, in turn, be accessed from the Internet and displayed in the user's work area 606. Alternatively, the Web page can be made to display on the entire display screen. Thus, the user can catalog or otherwise organize Web pages and sites in the hierarchy window 604 and can access them. This allows the user a degree of integration of the object information scheme of the present invention with existing Web sites, pages, and information.

The user can also click on any of the data definitions such as data definition 608.

Figure 9:
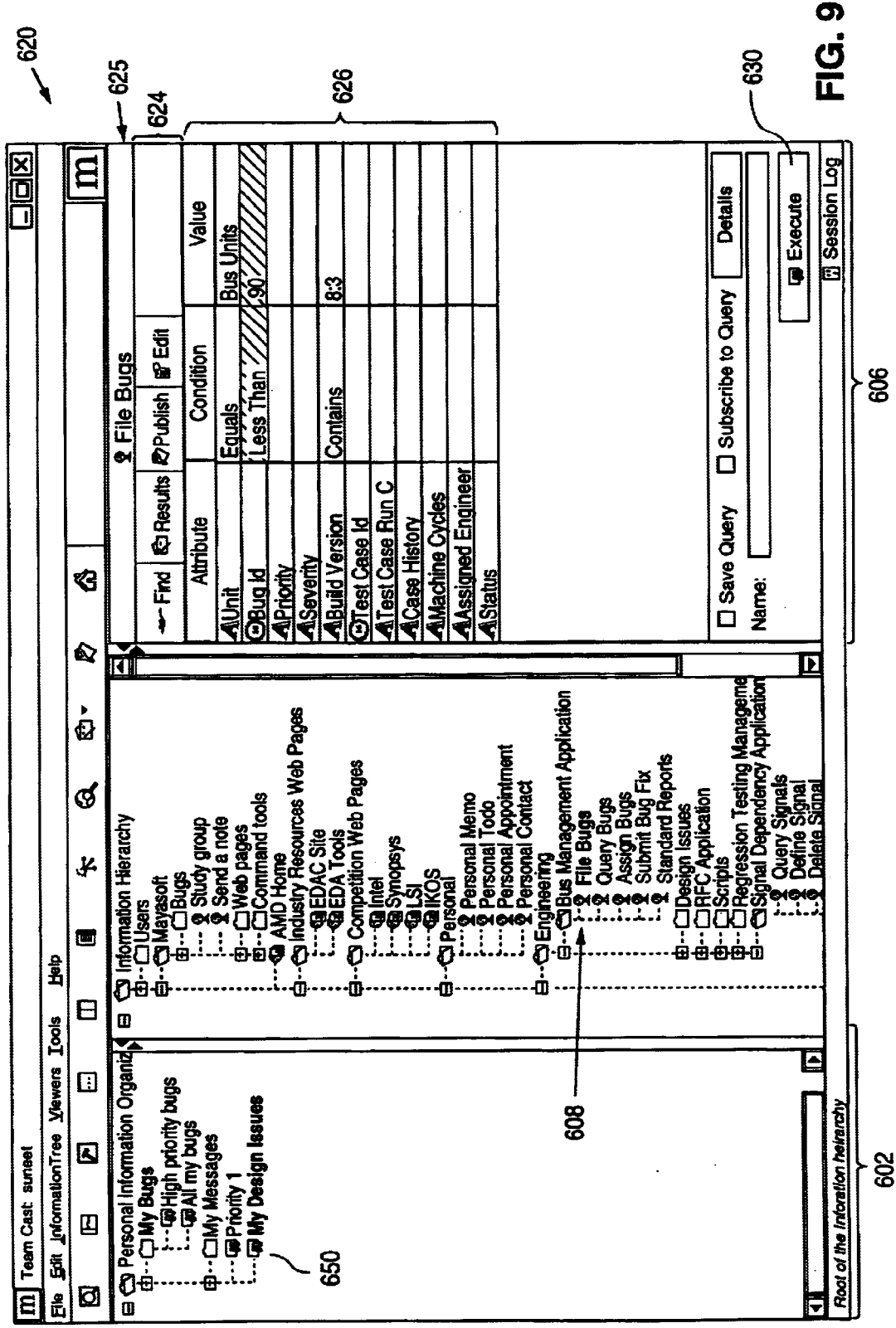
FIG. 9 shows a second user interface display.

FIG. 9 shows screen display 620 as it would appear after the user clicks on the File Bugs data definition 608 of FIG. 8. In FIG. 9, note that the File Bugs data definition at 608 has been highlighted, that the header bar at 622 now shows that the File Bugs data definition is being displayed, and work window 606 shows details of the File Bugs data definition attribute and value pairs.

Specifically, the data definition is shown along with its Attribute/Value pairs in the record display at 626 along with a "Condition" column separating the attribute and attribute values. The Condition column is included in the display because the specific display is that of the "Find" function tab. Although difficult to discern from the reprinting in this document, sufficient highlighting and animation is provided in the operation of the user interface so that when one of the function tabs "Find" results, "Publish," or "Edit" is selected at 624, the selection is easily discernible by the user.

The Find function allows the user to formulate relational queries based on attributes and attribute values. The user is able to specify relational conditions by using attributes and attribute values. Hence, the user is provided with a Condition column separating the attribute and value columns. In the preferred embodiment, the user can use the Condition button at the top of the Condition column to aid in the selection of a Condition. For example, where the attribute has a "text" or "alphanumeric" text type value field, pressing the Condition button will cause a drop-down menu to be displayed with options such as "Equals," "Not Equals," "Starts With," "Ends With," and "Contains." This is illustrated in FIG. 10.

Figure 10:
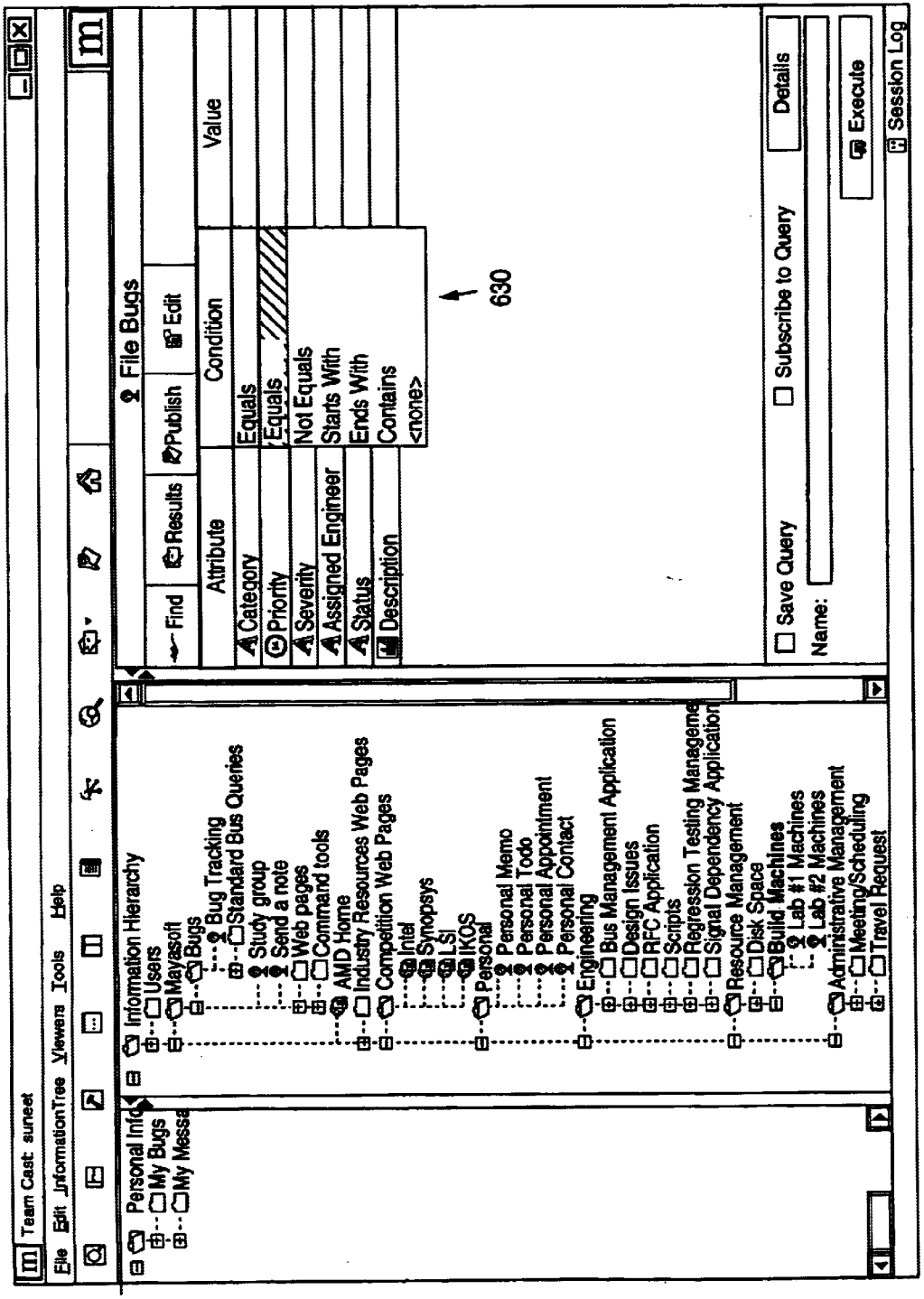
FIG. 10 shows a third user interface display.

In FIG. 10, the pull-down menu resulting from pressing the Condition button is shown at 630. Note that the "<none>" option allows no condition to be associated with a specific attribute/value pair. Also, the user may enter conditions by simply clicking on the specific condition field between any desired attributes and value pair and entering that condition from the keyboard, or by other means. Also, the number and type of possible selections provided by the drop-down menus as, for example, under the Condition button as just described, can be changed according to the specific data definition. The Condition drop-down menu is provided merely as a convenience to a user.

Returning to FIG. 9, note that icons to the left side of the attribute column are used to indicate the type of value field associated with the attribute, assuming that the value field is of a generic type. For example, the "A" icon indicates an alphanumeric field, commonly referred to as a character string or "text" field; while the "16" icon next to the "Priority" attribute indicates an integer value type is required.

Similar to the provision of the pull-down menu under the Condition button, pull-down menus can be provided under the "Attribute" and "Value" buttons to assist the user in manipulating information in the data definition. For example, where values for an attribute such as "Build Version" are restricted to, e.g., 8.2, 8.3, 8.4; the value pull-down menu, assuming that the user has highlighted the "Build Version" row, will show only those values as possible selections. In the find function, the user is not able to modify the attribute names. However, in other functions such as the "Edit" function, the attribute names may be modified in a similar fashion to the condition and value columns.

As shown in FIG. 9 by the data definition table at 626, there are three conditions existing on a query being composed by the user. The first row of the record shows that a required condition is that the "Unit" attribute "Equals" the value "Bus Unit." Since the "Unit" attribute is an alphanumeric field, this means that the character string "Bus Unit" must be the value of the "Unit" attribute if an object instance of this "File Bugs" data definition is to match the query. In a similar fashion, the "Bug ID" attribute must have a value less than 90. Also, "Build Version" must contain the value "8.3."

Once the query has been composed, the user may decide to do one of three things with the query. First, the user can execute the query immediately by pressing the "Execute" button shown at 630 in FIG. 9. Or, the user may save the query by clicking the box "Save Query" toward the bottom of the work window. Finally, the user may subscribe to the query by clicking the appropriate "Subscribe to Query" box towards the bottom of the work window.

Figure 11:
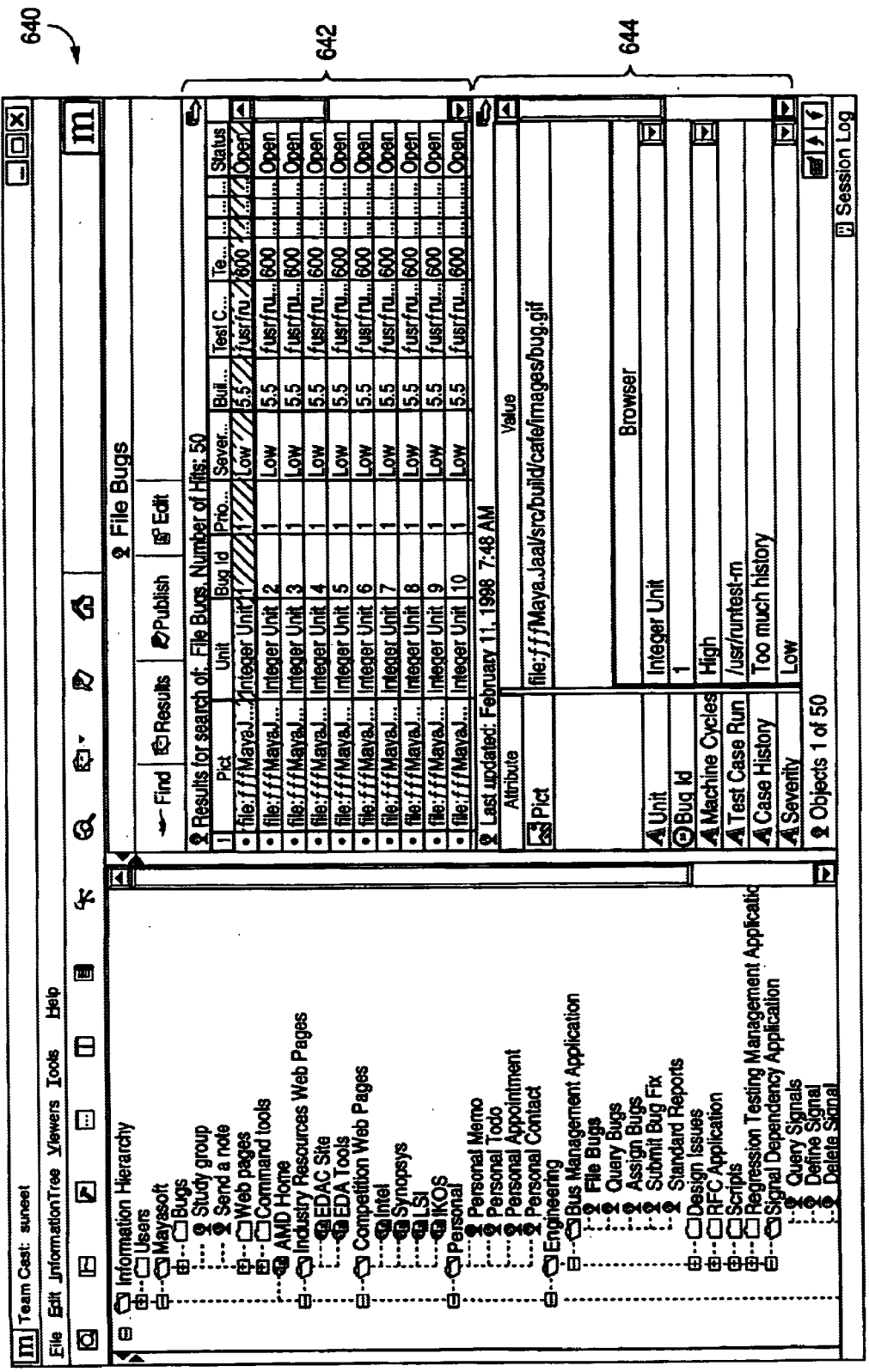
FIG. 11 shows a fourth user interface display.

Assuming the user chooses to immediately execute the query by pressing he "Execute" button at 630, the display of FIG. 11 is generated.

FIG. 11 shows screen display 640 which includes the results of executing he query of FIG. 9. The data browser program, in response to the "Execute" command issued by the user, automatically invokes the "Results" function. The results window is shown at 642 in accordance with the results function tab being selected. In actuality, the results window at 642 extends further downward; however, it is overlaid by a record window showing the currently selected object instance at 644. In the examples so far, the currently selected object instance is the topmost row of results window 642. This is shown highlighted as inverse video, i.e., white on black. Records window 644 shows the complete details of the attributes/values pairs of the highlighted record. Naturally, the user may then browse the results of the query by using the mouse and pointer to select desired object instances, or records, and view these in more detail in records window 644. Note that all of the results match the query conditions. Namely, the results of executing the query return only object instances where the unit attribute is equal to "Bus Unit," the "Bug ID" attribute has a value less than 90, and the "Build Version" attribute contains the value 8.3.

As discussed in the system description above, the scope of the search of the query includes all instances of the class defined by the data definition. That is, the field of search is initially determined by the originator of the object definition. Since the user operating the user interface of the subject figures herein obtains the object from the originator, or from someone else who ultimately obtained it from the originator, the user's query based on relational conditions of attributes/values pairs in the object instance encompasses all instances of the class of defined objects, "File Bugs." As discussed above, this is subject to limitations imposed on the scope of query as, for example, where security issues are concerned, derivatives of the object have been made by third parties and are thus subject to any limitations imposed by those third parties or imposed on those third parties. See the detailed discussion regarding security and scope of query above.

Thus, the user's ability to make complex queries on a large amount of data instances should be apparent. In this example of bug reports in a semiconductor design group, the user can make queries dealing with the status of problems in the design, personnel assigned to solve the problem, related problems, repeated problems, the number of problems per unit time, etc. The number of relational query compositions that can be made is almost endless and certainly encompasses almost any conceivable query that an engineer or manager could be interested in.

Note that the above execution of a query was instantaneous. FIG. 11 shows that the query results were updated on Feb. 11, 1998, at 7:48 a.m. In this case, this is a "snapshot" or "one-time" query execution. However, the present invention also provides for a user creating and maintaining a "persistent query." This is done by checking the "Subscribe to Query" box shown in FIG. 9.

In FIG. 9, assuming the user has checked the "Subscribe to Query" box, the query does not execute immediately as in the previously described example. Instead, an entry appears in the query window 602. As part of defining the persistent query, the user would not only check the "Subscribe to Query" box, but would enter a name in the name field at the bottom of work window 606. After the name is entered, the user can hit the "Execute" button 630 to create the persistent query which appears in query window 602 with the appropriate name. Assuming the user has used the name "My Design Issues" as the persistent query, FIG. 9 shows the query named "My Design Issues" having 50 hits. The user can then click on "My Design Issues" 650 to obtain the results screen similar to those shown in FIG. 11. However, since the query is now persistent, any subsequent instances of "File Bugs" objects that satisfy the query conditions will be logged and reflected in the number to the right of "My Design Issues." For example, assuming that an additional entry is published (discussed in detail below) by another engineer/user of the system that meets the conditions of the composed query, the number to the right of "My Design Issues" 650 would increase from 50 to 51.

The use of persistent queries in this way provides the user with an automatically updated information repository. This is more precise than any subscription mechanism available on the Internet today. This mechanism is also comprehensive and reliable in that the user knows the quality and boundaries of the scope of the query. That is, the user is querying objects within the user's design group. Another feature of the present graphical user interface is that the query is treated by the interface as any other information object, such as a file folder, data definition, etc. Thus, the user is able to organize the queries as though they are traditional file folders or files. This greatly simplifies the user interface by making the query organizable and manipulable in a form with which computer users are already familiar. A persistent query can also be thought of as an "In-box" similar to an email in-box. As long as the query persists, instances that meet the query requirements will be "deposited" into the "space" defined by the query on the user's local server or machine (i.e., wherever the user has defined his or her data place). The instances appear as information objects, similar to email messages, to continue the analogy, whenever the user clicks on the persistent query represented as a node in the hierarchy tree.

The "Save Query" check box allows a user to save a query without subscribing or executing the query.

FIGS. 12–16C are next discussed to describe the ability of the data browser of the present invention to provide different features by using algorithms obtained outside of the data browser application program, itself.

A feature of the system of the invention is that algorithms are treated in a similar fashion as the data. That is, algorithms, code, programs or, generally, any form of executable instructions can be supplied to the data browser, or another program, as a "value" of an attribute.

Figure 14C:
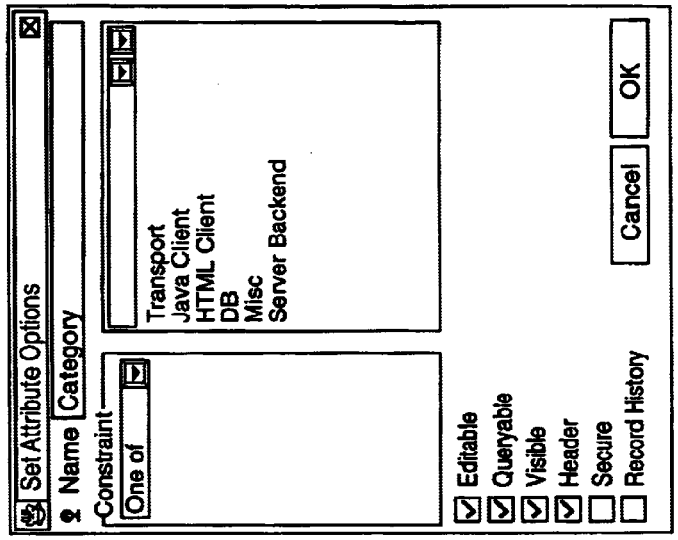
FIG. 14C shows a ninth user interface display.

For example, FIG. 14C shows a "Category" attribute which can be associated with any arbitrary data definition and which can be set to one of various executable languages or scripts such as "Transport," "Java Client," "HTML Client," "DB," "Server Back-end," or Miscellaneous. Once present in an object instance as a value for a particular object, the executable instructions may be invoked and executed automatically or optionally on command of the user. In this manner, new functionality can be associated with discrete data or single or multiple classes of data. New functionality can provide necessary or desired features for a user on an "as-needed" basis for a single application or multiple applications for one or more users. The possibilities presented by providing executable instructions in the information object architecture of the present invention provides an efficient tool in allowing a "thin" client to acquire powerful features when the features are needed.

Figure 12:
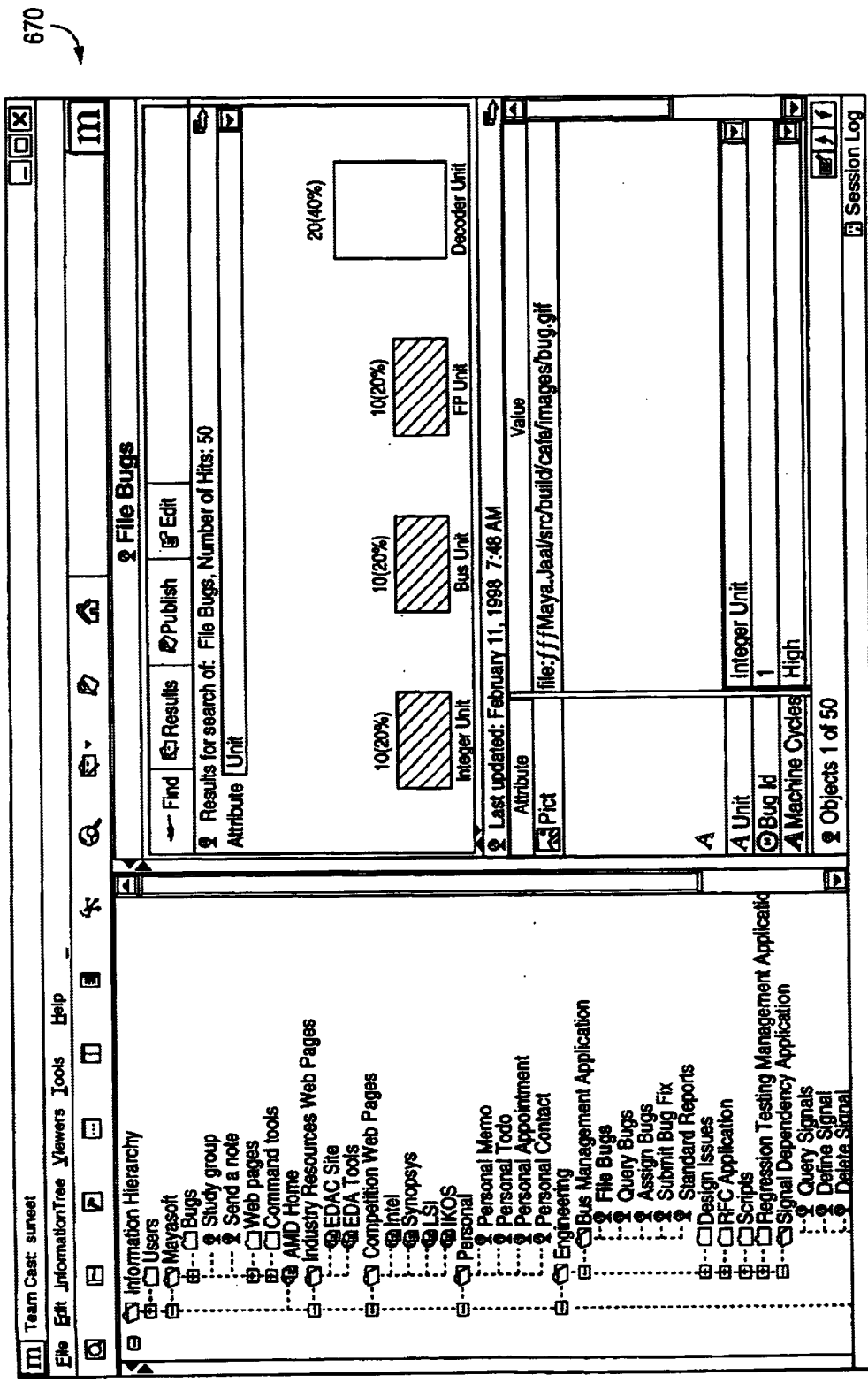
FIG. 12 shows a fifth user interface display.

As an example of the case where a new feature is provided with discrete data, FIG. 12 shows screen display 670 where the display for the "Results" function tab in the work window is much different from the "Results" display presented earlier in connection with FIG. 11. Rather than the table format of FIG. 11, FIG. 12 shows the data as a bar chart. The height of each bar is proportional to the number of times that an attribute assumes the indicated value as a ratio of the total number of hits in the collection of instances. Although not shown in FIG. 12, the bars are color coded, also. The ability to view specific instances in different formats can be provided as a set of executable instructions with the instance itself. Alternatively, the executable instructions can be initially obtained from an information object's instance and stored for later use by an application program. In this way, the application program can be configured with selectable executable options that are always up-to-date. In this manner, any type of information display can be achieved—or any type of functionality, for that matter.

Figure 13:
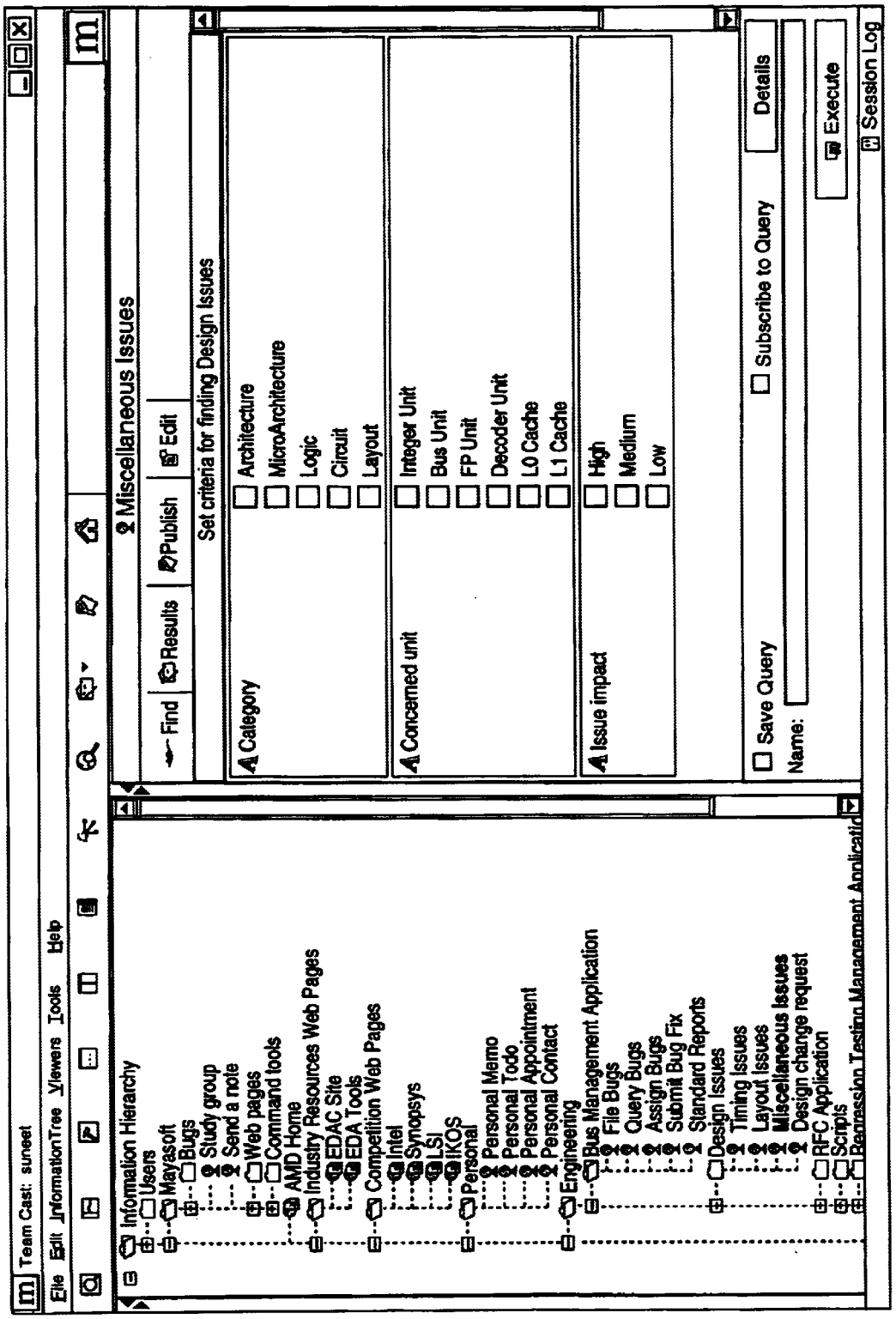
FIG. 13 shows a sixth user interface display.

Different executable instructions can be provided for any of the function tab operations of "Find," "Results," "Publish" and "Edit." An example of the "Find" function being modified according to executable instructions supplied with the "Miscellaneous Issues" information object is shown in FIG. 13. A comparison of FIG. 13 with previously discussed FIG. 10 shows that FIG. 13 allows the user to compose a query based on selection boxes rather than conditions within a tabulated record as shown in FIG. 10. In the preferred embodiment, the Data Browser is a Java Client. The Data Browser is running in a Mini-JAVA Operating System (JAVA OS) called "Java Virtual Machine" (JVM). JAVA-OS/JVM is embedded in the native operating system of the user's platform such as Unix, Windows, or NT. Or the JAVA-OS/JVM can be embedded in a special application like Netscape's Navigator Web browser. The Data Browser of the preferred embodiment is a "baseline" JAVA client that can be extended by the additional executable instructions that the Data Browser obtains; for example, by accessing an information object instance with associated executable instructions, by accessing executable instructions directly, or by other means as discussed herein. JAVA is chosen as the environment for the preferred embodiment because of JAVA's ability to link additional executable instructions at run-time. However, the present invention can be adapted for other operating environments.

Figure 14A:
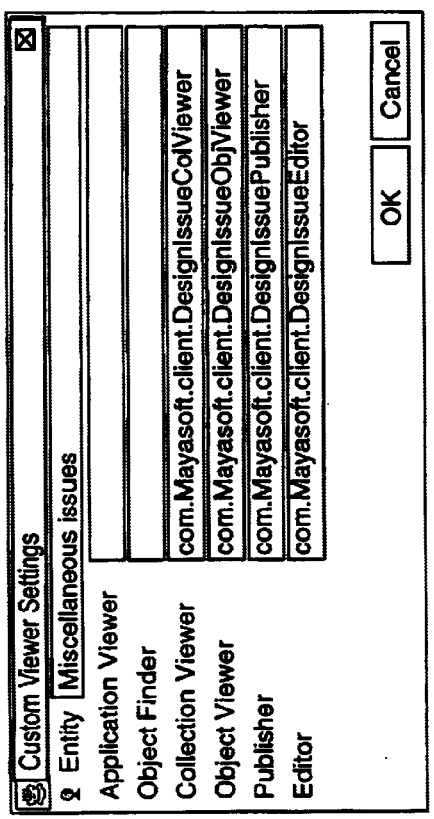
FIG. 14A shows a seventh user interface display.

FIG. 14A shows a "Custom Viewer Settings" dialog box for the data browser. This dialog box shows the executable instructions that are used to view the entity, or data definition, "Miscellaneous Issues." The default features for implementing the various functions "Collection Viewer," "Object Viewer," "Publisher" and "Editor" have been overlayed by, respectively, "com.Mayasoft.client. DesignIssueColViewer," "com.Mayasoft.client. DesignIIssueObjViewer," "com.Mayasoft.client. DesignIssuePublisher" and "com.Mayasoft.client. DesignIssueEditor" so that new functions are used for these features over the data browser's built-in functions. Note that the executable instruction modules are referenced by the HTTP URL+pathname convention presented above and so are unique within the worldwide Internet system. Although the data browser application discussed here is shown in an Intranet application, the example is easily generalized to a group of engineers in different parts of the world communicating over the Internet.

Figure 14B:
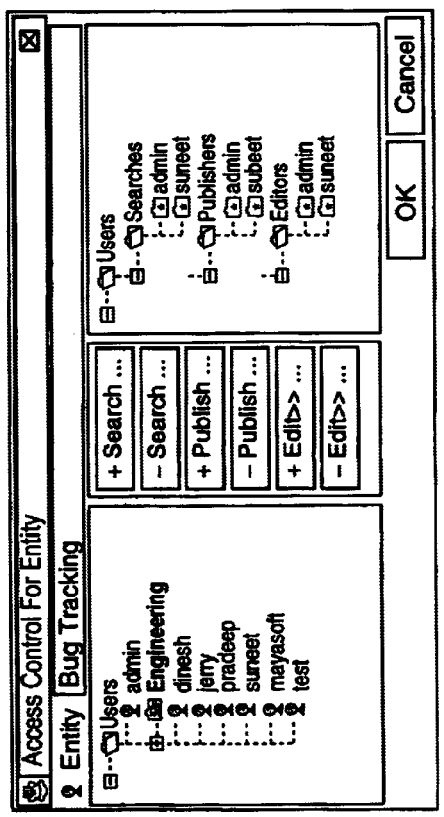
FIG. 14B shows a eighth user interface display.

FIG. 14B shows the "Access Control For Entity" dialog box used to limit different users' abilities to access information objects. This is primarily provided for security control. By using the dialog box of FIG. 14B, an administrator (using a password or other form of ID) can assign rights to search, publish or edit specified classes of information objects.

Although the user interface has been presented as an example of a specific application program, namely, a data browser in a chip design group, it should be apparent that a limitless number of applications can be designed around the information object system architecture presented herein. In fact, a great number of useful applications need not use any other application other than the data browser. For example, a generalized email system can be implemented that has more powerful features than most email systems available today using the same data browser discussed so far. This is accomplished by establishing an object definition of "Email Message" that is subscribed to by various members of a group. The "Email Message" includes attributes such as "Subject," "From," "To," "Date" and "Body." "In Boxes" are easily established for each user by creating a persitent query for each user where the condition of the "To" attribute must include the user's name.

Whenever a new email message instance is created with a given user's name in the "To" field, the instance will increment the user's query. By providing a "Results" executable overlay the user's email can be arranged in chronological order. Such features as filtering mail, deleting mail, prioritizing mail, etc. are easily handled simply by imposing conditional relationships in the persistent query. The effect of using the attribute/value information object structure in a system having host processing as discussed above (in the system description section) and allowing user-defined relational queries and data-provider-created (or user-created, for that matter) executable instruction overlays is that a powerful data browser application that is compact and efficient can be designed to handle many different applications.

What is claimed is:

1. A computer system for augmented processing of information objects in a distributed messaging framework in a computer network, the computer system having a computer network connecting a plurality of computers, wherein a plurality of information objects that are instances of class definitions resides in the computers, wherein the class definitions include attribute/value pairs, the computer system comprising:

a source computer connected to one or more destination devices via the computer network;

a first information object that is a first instance of one of the class definitions contained in one of the computers in the network;

a source computer program executable by the source computer, the source computer program comprising computer instructions for transmitting a second information object to one of the destination devices, the second information object being a second instance of the class definition of the first information object; and a robot computer program executable by either the source computer or one of the destination devices, the robot computer program comprising computer instructions for:

identifying the first information object;

making a relational condition based on the attribute/value pairs of the first information object;

intercepting the second information object transmitted by the source computer to the destination device;

determining that the second information object, which is the second instance of the class definition of the first information object, satisfies the relational condition;

augmenting one or more of the attribute/value pairs of the second information object; and transmitting the augmented information object to the destination device.

2. The computer system of claim 1, wherein the information object is transmitted from the source computer to the destination device according to a publish-subscribe model.

3. The computer system of claim 1, wherein the destination device is a computer.

4. The computer system of claim 1, wherein the destination device is a storage device.

5. The computer system of claim 1, wherein the destination device is a storage location on the computer network.

6. The computer system of claim 1, wherein the destination device is a processor.

7. The computer system of claim 1, wherein the robot computer program is executed by the source computer.

8. The computer system of claim 1, wherein the robot computer program is executed by the destination device.

9. The computer system of claim 1, wherein the robot computer program comprises computer instructions for:
   intercepting the information object transmitted by the source computer to a first destination device;
   modifying the information object; and
   transmitting the modified information object to a second destination device, wherein the first destination device is different from the second destination device.

10. The computer system of claim 1, wherein the robot computer program comprises computer instructions for:
    intercepting the information object transmitted by the source computer to a first destination device;
    modifying the information object; and
    transmitting the modified information object to the first destination device.

11. The computer system of claim 1, wherein the computer instructions for modifying the information object comprise
    computer instructions for checking a set of conditions and modifying the information object only if the set of conditions is satisfied.

12. The computer system of claim 1, further comprising:
    a first robot computer program executable by either the source computer or one of the destination devices; and
    a second robot computer program executable by either the source computer or one of the destination devices,
    wherein the first robot computer program comprises computer instructions for:
      intercepting the information object transmitted by the source computer to the destination device; and
      transmitting the information object to the second robot computer program; and
    wherein the second robot computer program comprises computer instructions for:
      modifying the information object; and
      transmitting the modified information object to the destination device.

13. The computer system of claim 12, wherein the first robot computer program further comprises computer instructions for modifying the information object before transmitting the modified information object to the second robot computer program.

14. The computer system of claim 13, wherein the second robot computer program further comprises computer instructions for receiving the modified information object from the first robot computer program.

15. The computer system of claim 1, wherein the robot computer program further comprises:
    an intermediate program to intercept the transmitted information object and to modify the transmitted information object.

16. The computer system of claim 1, wherein the robot computer program further comprises:
    instructions for intercepting the information object after the information object is transmitted by the source computer and before the information object is displayed to a user.

17. The computer system of claim 1, wherein the robot computer program resides at an interim point between the source computer and the destination device.

18. The computer system of claim 1, wherein the computer network further comprises one or more server computers between the source computer and the destination device, and the robot computer program resides at a first server computer, the robot computer program further comprising:
    instructions for intercepting the information object after the information object hops to the first server computer;
    instructions for modifying the information object at the first server computer; and
    instructions for forwarding the modified information object to the destination device.

19. The computer system of claim 1, wherein the robot computer program further comprises:
    instructions for intercepting the transmitted information object by the source computer before the information object reaches a network interface of the source computer;
    instructions for modifying the intercepted information object at the source computer; and
    instructions for transmitting the modified information object through the network interface of the source computer.

20. The computer system of claim 1, wherein the robot computer program further comprises:
    instructions for detecting an instance of a class associated with the intercepted information object;
    instructions for adding information associated with the instance to the information object.

21. The computer system of claim 1, wherein the robot computer program further comprises:
    instructions for restricting information in the intercepted information object based on an identifier for the destination device.

22. The computer system of claim 1, wherein the robot computer program further comprises:
    instructions for tracking a number of requests for the intercepted information object.

23. The computer system of claim 1, wherein the computer network has a network protocol that uses a network addressable semantically interpretable byte set (NASIB).

24. A method of augmented processing of information objects executable on a computer coupled to a computer network connecting a plurality of computers, wherein a plurality of information objects that are instances of class definitions resides in the computers, and wherein the class definitions include attribute/value pairs, the method comprising:
    selecting a first information object that is a first instance of one of the class definitions;
    making a relational condition based on the attribute/value pairs of the first information object;
    intercepting a second information object transmitted by a source computer to a destination device via the computer network, the second information object being a second instance of the class definition of the first information object;
    determining that the second information object, which is the second instance of the class definition of the first information object, satisfies the relational condition;

augmenting one or more of the attribute/value pairs of the second information object; and transmitting the augmented information object to the destination device.

25. The method of claim 24, wherein the information object is transmitted from the source computer to the destination device according to a publish-subscribe model.

26. The method of claim 24, wherein the destination device is a computer.

27. The method of claim 24, wherein the destination device is a storage device.

28. The method of claim 24, wherein the destination device is a storage location on the computer network.

29. The method of claim 24, wherein the destination device is a processor.

30. The method of claim 24, further comprising:

intercepting the information object transmitted by the source computer to a first destination device;

modifying the information object; and transmitting the modified information object to a second destination device, wherein the first destination device is different from the second destination device.

31. The method of claim 24, further comprising:

intercepting the information object transmitted by the source computer to a first destination device;

modifying the information object; and transmitting the modified information object to the first destination device.

32. The method of claim 24, further comprising checking a set of conditions and modifying the information object only if the set of conditions is satisfied.

33. The method of claim 24, further comprising:

intercepting the information object transmitted by the source computer to a first destination device; and transmitting the information object to a second destination device;

modifying the information object in the second destination device; and transmitting the modified information object to the first destination device.

34. The method of claim 33, further comprising modifying the information object before transmitting the modified information object to the second destination device.

35. A computer-readable storage medium comprising a robot computer program executable by either a source computer connected to one or more destination devices via a computer network or by one of the destination devices, wherein the server computer transmits an information object to one of the destination devices and the robot computer program comprises computer instructions for:

selecting a first information object that is a first instance of a class definition;

making a relational condition based on attribute/value pairs of the first information object;

intercepting a second information object transmitted by the source computer to the destination device via the computer network, the second information object being a second instance of the class definition of the first information object;

determining that the second information object, which is the second instance of the class definition of the first information object, satisfies the relational condition;

augmenting one or more attribute/value pairs of the second information object; and transmitting the augmented information object to the destination device.

* * * * *